(12) United States Patent
Yamasaki et al.

(10) Patent No.: US 8,483,023 B2
(45) Date of Patent: *Jul. 9, 2013

(54) OPTICAL HEAD, DIFFRACTION DEVICE, OBJECTIVE LENS, AND OPTICAL DISC APPARATUS

(75) Inventors: Fumitomo Yamasaki, Nara (JP); Yoshiaki Komma, Osaka (JP); Katsuhiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 40 days.

This patent is subject to a terminal disclaimer.

(21) Appl. No.: 13/153,713

(22) Filed: Jun. 6, 2011

(65) Prior Publication Data

US 2011/0235492 A1    Sep. 29, 2011

Related U.S. Application Data

(62) Division of application No. 11/951,937, filed on Dec. 6, 2007.

(60) Provisional application No. 60/877,606, filed on Dec. 29, 2006.

(30) Foreign Application Priority Data

Dec. 8, 2006  (JP) .................................. 2006-331534

(51) Int. Cl.
*G11B 7/00*    (2006.01)

(52) U.S. Cl.
USPC ...................................................... 369/44.11

(58) Field of Classification Search
None
See application file for complete search history.

(56) References Cited

U.S. PATENT DOCUMENTS

| | | | |
|---|---|---|---|
| 5,886,970 | A | 3/1999 | Tachibana et al. |
| 6,043,912 | A | 3/2000 | Yoo et al. |
| 6,104,689 | A | 8/2000 | Noguchi |
| 7,352,517 | B2 | 4/2008 | Kimura |

FOREIGN PATENT DOCUMENTS

| | | |
|---|---|---|
| JP | 7-98431 | 4/1995 |
| JP | 8-263869 | 10/1996 |
| JP | 9-44856 | 2/1997 |
| JP | 9-212894 | 8/1997 |
| JP | 9-265656 | 10/1997 |
| JP | 09-320179 | 12/1997 |
| JP | 10-10308 | 1/1998 |
| JP | 2003-233912 | 8/2003 |
| JP | 2005-203018 | 7/2005 |
| JP | 2006-313647 | 11/2006 |

OTHER PUBLICATIONS

Patent Cooperation Treaty (PCT) International Preliminary Report on Patentability issued Jan. 15, 2008 in International Application No. PCT/JP2007/073659.

*Primary Examiner* — Joseph Feild
*Assistant Examiner* — Parul Gupta
(74) *Attorney, Agent, or Firm* — Wenderoth, Lind & Ponack, L.L.P.

(57) ABSTRACT

An object of the present invention is to reduce the influence of a stray light incident on a light receiving device by reflection of an unnecessary diffraction light not contributing to write or read on a disc surface at write or read of an optical disc having a large surface reflectivity with respect to an information recording surface. A position in which a diffraction light with an n-order in an advancing path and the n-order in a returning path, reflected on the information recording surface of a first information recording medium, is focused by a condensing lens is different from a position in which a diffraction light different from the n-order diffraction light in at least one of the advancing path and the returning path, reflected on a surface of the first information recording medium, is focused by the condensing lens.

8 Claims, 34 Drawing Sheets

Fig. 5

| ADVANCING PATH / RETURNING PATH | PLUS-FIRST-ORDER DIFFRACTION LIGHT 15% | ZERO-ORDER DIFFRACTION LIGHT 65% | MINUS-FIRST-ORDER DIFFRACTION LIGHT 10% |
|---|---|---|---|
| PLUS-FIRST-ORDER DIFFRACTION LIGHT 15% | SIGNAL LIGHT H 2.3% | STRAY LIGHT (1) 9.8% | STRAY LIGHT (3) 1.5% |
| ZERO-ORDER DIFFRACTION LIGHT 65% | STRAY LIGHT (2) 9.8% | SIGNAL LIGHT B 42.3% | STRAY LIGHT (5) 6.5% |
| MINUS-FIRST-ORDER DIFFRACTION LIGHT 10% | STRAY LIGHT (4) 1.5% | STRAY LIGHT (6) 6.5% | STRAY LIGHT (7) 1.0% |

CLOSE TO DISC ← → AWAY FROM DISC

OPTICAL HEAD, DIFFRACTION DEVICE, OBJECTIVE LENS, AND OPTICAL DISC APPARATUS

CROSS-REFERENCE TO RELATED APPLICATION

This application is a divisional of U.S. application Ser. No. 11/951,937, filed Dec. 6, 2007, which claims the benefit of U.S. Provisional Application No. 60/877,606, filed Dec. 29, 2006, the entireties of which are incorporated herein by reference.

BACKGROUND OF THE INVENTION

1. Field of the Invention

The present invention relates to an optical head which optically writes or reads information to/from plural kinds of information recording media such as optical discs, a diffraction device and an objective lens used for the optical head, an optical disc apparatus including the optical head, and a computer, an optical disc player, and an optical disc recorder including the optical disc apparatus.

2. Description of the Related Art

In recent years, with a blue-violet semiconductor laser in practical use, a Blu-ray Disc (hereinafter, a BD) as a high density and large capacity optical information recording medium (hereinafter, referred to as an optical disc) having the same size as that of a CD (Compact Disc) and a DVD (Digital Versatile Disc), has been put to practical use. The BD is an optical disc which has a protective material having a thickness of about 0.1 mm and performs write or read using a blue-violet laser light source having a wavelength of about 400 nm and an objective lens having a numerical aperture (NA) up to 0.85.

An HD DVD which has a protective material having a thickness of 0.6 mm and a blue-violet laser light source having a wavelength of about 400 nm and an objective lens having a numerical aperture of 0.65 are used has also been put to practical use.

There has been proposed an optical head which has compatibility and focuses a laser beam onto information recording surfaces of such optical discs having different protective material thicknesses using one objective lens so as to write or read information.

Each of Japanese Patent Application Laid-Open (JP-A) No. H7-98431 and Japanese Patent Application Laid-Open (JP-A) No. H10-10308 disclose an optical head having a focusing optical system which can focus a laser beam onto optical discs having different protective material thicknesses to diffraction limit.

FIG. 33 shows a configuration example of a conventional optical head disclosed in the Japanese Patent Application Laid-Open (JP-A) No. H7-98431. In FIG. 33, an optical head 130 includes a light source 101 for emitting a red laser beam, a beam splitter 103, a collimate lens 104, a hologram lens 105, an objective lens 106, a detecting lens 108, and a light receiving device 109. A DVD 70 is an optical disc having a protective material thickness of 0.6 mm.

The operation of the optical head 130 which writes or reads information to/from the DVD 70 will be described. The red laser beam emitted from the light source 101 passes through the beam splitter 103 and is then converted to a substantially parallel beam by the collimate lens 104. The red laser beam passes through the hologram lens 105 and is then focused as a light spot onto an information recording surface of the DVD 70 beyond a protective material by the objective lens 106. The red laser beam in a returning path reflected on the information recording surface of the DVD 70 passes through the objective lens 106, the hologram lens 105, and the collimate lens 104 in the same optical path as an advancing path. The red laser beam in the returning path is reflected by the beam splitter 103 and is then given predetermined astigmatism by the detecting lens 108. Finally, the red laser beam in the returning path is led to the light receiving device 109 so as to generate an information signal and a servo signal.

The operation of the optical head 130 for performing write or read to/from a CD 80 as an optical disc having a protective material thickness of 1.2 mm will be described with reference to FIG. 34. The red laser beam emitted from the light source 101 passes through the beam splitter 103 and is then converted to a substantial parallel beam by the collimate lens 104. The red laser beam is diffracted by the hologram lens 105 and is then focused as a light spot onto an information recording surface of the CD 80 beyond a protective material by the objective lens 106. The red laser beam in a returning path reflected on the information recording surface of the CD 80 passes through the objective lens 106, the hologram lens 105, and the collimate lens 104 in the same optical path as an advancing path. The red laser beam in the returning path is reflected by the beam splitter 103 and is then given predetermined astigmatism by the detecting lens 108. Finally, the red laser beam in the returning path is led to the light receiving device 109 so as to generate an information signal and a servo signal.

A focus error signal for performing write or read to/from the DVD 70 and the CD 80 can be detected by using an astigmatism method, etc. of detecting a focal spot given the astigmatism by the detecting lens 108 in a four-part split light receiving pattern in the light receiving device 109. A tracking error signal can be detected by using what is called a three-beam method, a differential push-pull method (DPP method), and the like which use a main beam and a sub-beam generated by a diffraction grating (not shown).

The functions of the hologram lens 105 and the objective lens 106 will be described in detail with reference to FIGS. 35 and 36.

The hologram lens 105 has a grating pattern 105a as shown in FIG. 35 for focusing a very small light spot onto each of the DVD 70 and the CD 80. The diffraction efficiency of a plus-first-order diffraction light of the hologram lens 105 is less than 100%. The hologram lens 105 is designed in such a manner that a transmission light (hereinafter, in the present invention, a non-diffracted transmission light can also be represented as a zero-order diffraction light and the transmission light is handled as one of diffraction lights) has sufficient intensity. The hologram lens 105 is blazed so as to increase the sum of the amount of the zero-order diffraction light and a plus-first-order diffraction light. The light utilization efficiency can be high.

The objective lens 106 has an NA of 0.6 and is designed so as to form a focal spot onto the DVD 70 having a protective material with a thickness of 0.6 mm to diffraction limit, as shown in FIG. 36A, when the laser beam passed through the hologram lens 105 without being diffracted (that is, the zero-order diffraction light) is incident.

As shown in FIG. 36B, the plus-first-order diffraction light diffracted by the hologram lens 105 is focused onto the CD 80 by the objective lens 106. Here, the plus-first-order diffraction light is aberration-corrected so as to form a focal spot onto the CD 80 having a protective material thickness of 1.2 mm to diffraction limit.

The hologram lens 105 for diffracting part of the incident light is combined with the objective lens 106 so as to realize a bifocal lens which can form a focal spot focused onto each of the optical discs having different protective material thicknesses to diffraction limit.

Since the hologram lens 105 has lens action, the positions of two focal points in the optical axis direction are different. Thus, when a light spot formed on one of the focal points is used to write or read information, a light spot focused on the other focal point is enlarged, which does not affect write or read of information.

With such optical head 130, information can be written or read to/from different kinds of optical discs using one objective lens.

SUMMARY OF THE INVENTION

Each of the Japanese Patent Application Laid-Open (JP-A) No. H7-98431 and Japanese Patent Application Laid-Open (JP-A) No. H10-10308 disclose the configuration of the optical head which can be compatible with plural kinds of optical discs, such as the DVD and CD, having different protective material thicknesses, with the bifocal lens using the hologram lens.

However, the conventional arts in those documents do not describe the influence of a stray light that an unnecessary diffraction light not contributing to write or read is reflected on the disc surface and then is incident on the light receiving device at write or read of the optical disc whose surface reflectivity with respect to the information recording surface is relatively large, e.g., having a plurality of information recording surfaces.

In the present invention, by defining a lens power given to the hologram lens, an object of the present invention is to reduce interference between a signal obtained by a light receiving device by reflection of a predetermined-order diffraction light used for write or read on a predetermined information recording surface and a signal obtained by the light receiving device by reflection of a diffraction light of an order not contributing to write or read on a disc surface, thereby performing stable information signal detection and servo signal detection.

An optical head according to a first aspect of the present invention includes: a light source; a diffraction device configured to diffract a laser beam emitted from the light source so as to generate diffraction lights of plural orders; an objective lens, with n and m as integers, configured to focus an n-order diffraction light generated by the diffraction device onto an information recording surface of a first information recording medium, and focus an m-order diffraction light onto an information recording surface of a second information recording medium; a condensing lens configured to condense the laser beam reflected on the information recording surface of the first information recording medium or the information recording surface of the second information recording medium; and a light receiving unit configured to receive the laser beam condensed by the condensing lens so as to generate a focus error signal, wherein the optical path of the laser beam before being reflected on the information recording medium is an advancing path, the optical path of the laser beam after being reflected on the information recording medium is a returning path, a position in the light receiving unit in which a diffraction light with the n-order diffraction light in the advancing path and the n-order diffraction light in the returning path, reflected on the information recording surface of the first information recording medium, is focused by the condensing lens being different from a position in the light receiving unit in which a diffraction light different from the n-order diffraction light in at least one of the advancing path and the returning path, reflected on a surface of the first information recording medium, is focused by the condensing lens.

An optical head according to a second aspect of the present invention includes: a light source; a diffraction device for diffracting a laser beam emitted from the light source so as to generate diffraction lights of plural orders; an objective lens, with n and m as different integers, for focusing an n-order diffraction light generated by the diffraction device onto an information recording surface of a first information recording medium, focusing an m-order diffraction light onto an information recording surface of a second information recording medium, and focusing the laser beam reflected on the information recording surface of the first information recording medium or the information recording surface of the second information recording medium; and a light receiving unit for receiving the laser beam focused by the objective lens so as to generate a focus error signal, wherein an optical path of the laser beam before being reflected on the information recording medium is an advancing path, an optical path of the laser beam after being reflected on the information recording medium is a returning path, and a position in the light receiving unit in which a diffraction light having the n-order diffraction light in the advancing path and the n-order diffraction light in the returning path, reflected on the information recording surface of the first information recording medium, is focused by the condensing lens is different from a position in the light receiving unit in which a diffraction light different from the n-order diffraction light in at least one of the advancing path and the returning path, reflected on the surface of the first information recording medium, is focused by the condensing lens.

The optical head according to the first aspect of the present invention may be designed so that the n and m are different integers, and the objective lens focuses the laser beams having the same wavelength emitted from the light source onto the information recording surface of the first information recording medium and the information recording surface of the second information recording medium.

The optical head according to the first aspect of the present invention may be designed so that the n and m are the same integers, and the objective lens focuses the laser beams having different wavelengths emitted from the light source onto the information recording surface of the first information recording medium and the information recording surface of the second information recording medium.

The optical head according to the first aspect of the present invention may be designed so that the n and m are different integers, and the objective lens focuses the laser beams having different wavelengths emitted from the light source onto the information recording surface of the first information recording medium and the information recording surface of the second information recording medium.

The optical head according to the first aspect and the second aspect of the present invention may be designed so that a position in the light receiving unit in which a diffraction light having an m-order diffraction light in the advancing path and the m-order diffraction light in the returning path, reflected on the information recording surface of the second information recording medium, is focused by the condensing lens is different from a position in the light receiving unit in which a diffraction light different from the m-order diffraction light in at least one of the advancing path and the returning path, reflected on a surface of the second information recording medium, is focused by the condensing lens.

The optical head according to the first aspect and the second aspect of the present invention may be designed so that a protective material thickness of the information recording surface of the first information recording medium is t1, a protective material thickness of the information recording surface of the second information recording medium is t2, so that t1<t2, and the objective lens focuses a zero-order diffraction light onto the information recording surface of the first information recording medium and focuses a plus-first-order diffraction light onto the information recording surface of the second information recording medium.

The optical head according to the first aspect of the present invention may be designed so that a position in the light receiving unit in which a diffraction light with a zero-order diffraction light in the advancing path and a zero-order diffraction light in the returning path, reflected on the information recording surface of the first information recording medium, is focused by the condensing lens is different from a position in the light receiving unit in which the zero-order diffraction light in one of the advancing path and the returning path and a minus-first-order diffraction light in the other path, reflected on the surface of the first information recording medium, is focused by the condensing lens.

The optical head according to the first aspect and the second aspect of the present invention may be designed so that a protective material thickness of the information recording surface of the first information recording medium is t1, a protective material thickness of the information recording surface of the second information recording medium is t2, a refractivity of the protective material is n, a first protective material thickness of the information recording surface of the first information recording medium is t1_L1, a second protective material thickness of the information recording surface of the first information recording medium is t1_L2, a working distance for write or read of the first information recording medium is WD1, a working distance for write or read of the second information recording medium is WD2, and a focal position interval difference between a plus-first-order diffraction light and the minus-first-order diffraction light is k, then $WD1-WD2 \neq (t2-t1-2 \times t1\_L1)/n-k$, and $WD1-WD2 \neq (t2-t1-2 \times t1\_L2)/n-k$ are satisfied.

The optical head according to the first aspect and the second aspect of the present invention may be designed so that $WD1-WD2 < (t2-t1-2 \times t1\_L1)/n-k$ is satisfied.

The optical head according to the first aspect and the second aspect of the present invention may be designed so that a position in the light receiving unit in which a diffraction light with a plus-first-order diffraction light in the advancing path and a plus-first-order diffraction light in the returning path, reflected on the information recording surface of the second information recording medium, is focused by the condensing lens is different from a position in the light receiving unit in which a minus-first-order diffraction light in the advancing path and a minus-first-order diffraction light in the returning path, reflected on a surface of the second information recording medium, is focused by the condensing lens.

The optical head according to the first aspect and the second aspect of the present invention may be designed so that a protective material thickness of the information recording surface of the first information recording medium is t1, a protective material thickness of the information recording surface of the second information recording medium is t2, a refractivity of the protective material is n, a protective material thickness of the information recording surface of the second information recording medium is t2_ra, a working distance for write or read of the first information recording medium is WD1, a working distance for write or read of the second information recording medium is WD2, and a focal position interval difference between the plus-first-order diffraction light and the minus-first-order diffraction light is k, then $WD1-WD2 \neq (2 \times t2-2 \times t1-t2\_ra)/(2 \times n)-k$ is satisfied.

The optical head according to the first aspect and the second aspect of the present invention may be designed so that $WD1-WD2 > (2 \times t2-2 \times t1-t2\_ra)/(2 \times n)-k$ is satisfied.

The optical head according to the first aspect and the second aspect of the present invention may be designed so that a protective material thickness of the information recording surface of the first information recording medium is t1, a protective material thickness of the information recording surface of the second information recording medium is t2, so that t1<t2, and the objective lens focuses a plus-first-order diffraction light onto the information recording surface of the first information recording medium and focuses a zero-order diffraction light onto the information recording surface of the second information recording medium.

In the optical head according to the first aspect of the present invention may be designed so that a position in the light receiving unit in which a diffraction light having the plus-first-order diffraction light in the advancing path and the plus-first-order diffraction light in the returning path, reflected on the information recording surface of the first information recording medium, is focused by the condensing lens is different from a position in the light receiving unit in which a diffraction light having the plus-first-order diffraction light in one of the advancing path and the returning path and a plus-second-order diffraction light in the other path, reflected on the surface of the first information recording medium, is focused by the condensing lens.

The optical head according to the first aspect and the second aspect of the present invention may be designed so that the objective lens is an objective lens having a diffraction structure integrated with the diffraction device.

The optical head according to the first aspect and the second aspect of the present invention may be designed so that an effective region of the objective lens has a first region having the diffraction structure and a second region not having the diffraction structure.

In the optical head according to the first aspect and the second aspect of the present invention may be designed so that the first region is an inner periphery region including the optical axis of the objective lens and the second region is a region around the first region.

The optical head according to the first aspect and the second aspect of the present invention may be designed so that an effective region of the objective lens has a first diffraction region in which a predetermined diffraction structure is formed in the inner periphery region including the optical axis of the objective lens and a second diffraction region in which a diffraction structure different from that of the first diffraction region is formed around the first region.

In the optical head in the first aspect and the second aspect of the present invention may be designed so that the second diffraction region is formed in such a manner that the diffraction efficiency of the plus-first-order diffraction light is maximum.

In the optical head according to the first aspect and the second aspect of the present invention may be designed so that the diffraction device and the objective lens are separated from each other.

In the optical head according to the first aspect and the second aspect of the present invention may be designed so that a reflectivity of the information recording surface of the first information recording medium is R1$r$, and a surface reflectivity thereof is R1$s$, then, 0.5≦R1$r$/R1$s$≦3.0 is satisfied.

In the optical head according to the first aspect and the second aspect of the present invention may be designed so that the first information recording medium has a plurality of information recording surfaces.

An objective lens according to a third aspect of the present invention has a diffraction structure for diffracting a laser beam emitted from a light source so as to generate diffraction lights of a plurality of orders, with n and m as integers, focusing an n-order diffraction light generated by the diffraction structure onto an information recording surface of a first information recording medium, and focusing an m-order diffraction light onto an information recording surface of a second information recording medium, wherein an optical path of the laser beam before being reflected on the information recording medium is an advancing path, the optical path of the laser beam after being reflected on the information recording medium is a returning path, and a position in which a diffraction light with the n-order diffraction light in the advancing path and the n-order diffraction light in the returning path, reflected on the information recording surface of the first information recording medium, is focused by a condensing lens for focusing the laser beam reflected on the information recording surface of the first information recording medium or the information recording surface of the second information recording medium is different from the position in which a diffraction light different from the n-order diffraction light in at least one of the advancing path and the returning path, reflected on the surface of the first information recording medium, is focused by the condensing lens.

A diffraction device according to a fourth aspect of the present invention has a diffraction structure configured to diffract a laser beam emitted from a light source so as to generate diffraction lights of plural orders, in which with n and m as integers, an n-order diffraction light generated by the diffraction structure being focused onto an information recording surface of a first information recording medium and an m-order diffraction light being focused onto an information recording surface of a second information recording medium by an objective lens, wherein an optical path of the laser beam before being reflected on the information recording medium is an advancing path, an optical path of the laser beam after being reflected on the information recording medium is a returning path, a position in which a diffraction light with the n-order diffraction light in the advancing path and the n-order diffraction light in the returning path, reflected on the information recording surface of the first information recording medium, is focused by a condensing lens for focusing the laser beam reflected on the information recording surface of the first information recording medium or the information recording surface of the second information recording medium being different from a position in which a diffraction light different from the n-order diffraction light in at least one of the advancing path and the returning path, reflected on a surface of the first information recording medium, is focused by the condensing lens.

An optical disc apparatus according to a fifth aspect of the present invention includes an optical head, a motor for rotating and driving an information recording medium, and a control unit for controlling the optical head and the motor, the optical head being an optical head defined in the first aspect and the second aspect.

An optical disc apparatus according to a sixth aspect of the present invention include: an optical head having a light source, an objective lens for focusing a laser beam emitted from the light source onto an information recording surface of an information recording medium, a light receiving unit for receiving the laser beam reflected on the information recording surface so as to generate a focus error signal, and an actuator for moving the objective lens in a focus direction; and a control unit for controlling the optical head, wherein the control unit determines the amount of movement of the objective lens based on a focus sensitivity in the relation between an electric current or a voltage to be supplied to the actuator and the amount of movement of the objective lens and starts focus control when the focus error signal obtained with movement of the objective lens in the direction close to the information recording medium exceeds a threshold value.

The optical disc apparatus according to the sixth aspect of the present invention may further include a memory for storing the focus sensitivity, wherein the control unit reads the focus sensitivity from the memory.

In the optical disc apparatus in the sixth aspect of the present invention, the optical head may further include a memory for storing the focus sensitivity, and the control unit may read the focus sensitivity from the memory.

In the optical disc apparatus in the sixth aspect of the present invention, the control unit may measure the focus sensitivity when the optical disc apparatus is turned on or the optical disc is inserted.

The optical disc apparatus according to the sixth aspect of the present invention may be designed so that the control unit measures the focus sensitivity using the focus error signal.

In the optical disc apparatus in the sixth aspect of the present invention may be designed so that the focus error signal used may be the focus error signal appearing before the focus error signal used for the focus control.

In the optical disc apparatus in the sixth aspect of the present invention, the control unit may stop the optical disc so as to measure the focus sensitivity.

In the optical disc apparatus in the sixth aspect of the present invention, the control unit may move the objective lens in the direction close to the optical disc at high speed at first and then, at a speed lower than the high speed.

In the optical disc apparatus in the sixth aspect of the present invention, the optical head may further include a spherical aberration correction mechanism and may match spherical aberration with the protective material thickness of the optical disc before the focus control is started.

A computer in a seventh aspect of the present invention includes: an optical disc apparatus defined in the sixth aspect; an input means for inputting information; a computation means for performing computation based on information read from the optical disc apparatus and/or information inputted from the input means; and an output means for outputting the information read from the optical disc apparatus and/or the information inputted from the input means and/or the result computed by the computation means.

An optical disc player in an eighth aspect of the present invention includes an optical disc apparatus defined in the sixth aspect; and a decoder for converting an information signal obtained from the optical disc apparatus to image information.

An optical disc recorder in a ninth aspect of the present invention includes an optical disc apparatus defined in the sixth aspect; and an encoder for converting image information to an information signal to be recorded by the optical disc apparatus.

The optical head of the present invention can satisfactorily perform write or read of plural different optical discs.

BRIEF DESCRIPTION OF THE DRAWINGS

FIG. 5 is a diagram showing the relation between the diffraction efficiencies of the hologram lens and a hologram integrated type objective lens according to the present invention, the amount of signal lights, and the amount of stray lights;

DETAILED DESCRIPTION OF THE INVENTION

Embodiments of an optical head, a diffraction device, an objective lens, an optical disc apparatus, a computer, an optical disc player, and an optical disc recorder according to the present invention will be described below with reference to the drawings.

(Embodiment 1)

Figure 1:
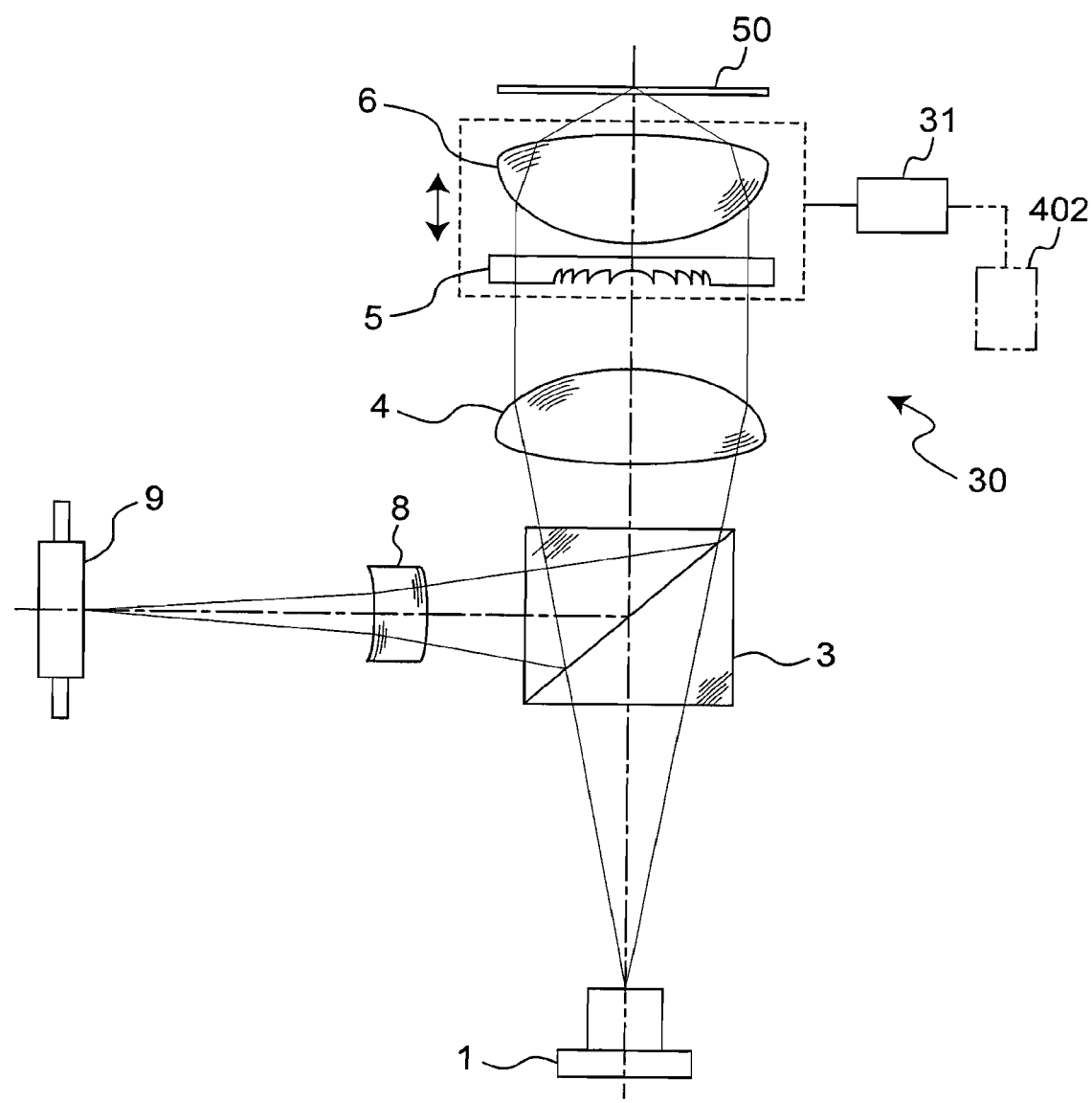
FIG. 1 is a schematic block diagram of an optical head for write or read of a first optical disc according to Embodiment 1 of the present invention.
Figure 2:
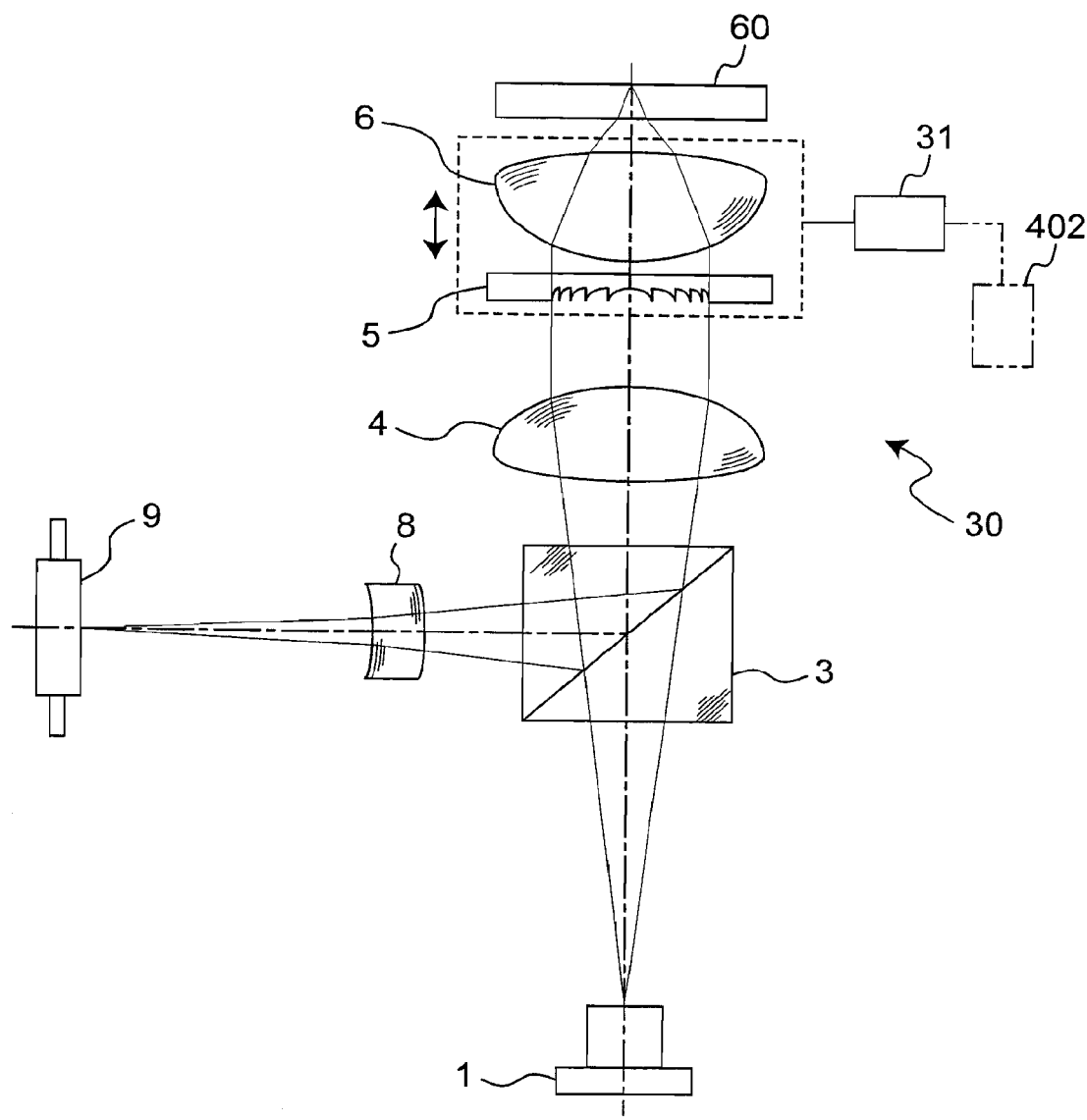
FIG. 2 is a schematic block diagram of the optical head for write or read of a second optical disc according to Embodiment 1 of the present invention.

FIGS. 1 and 2 are schematic block diagrams of the optical head according to an embodiment of the present invention.

In FIGS. 1 and 2, an optical head 30 includes a light source 1 emitting a blue-violet laser beam, a beam splitter 3, a collimate lens 4, a hologram lens 5, an objective lens 6, a detecting lens 8, and a light receiving device 9 for receiving the laser beam. The reference numeral 50 denotes a first optical disc as an optical disc having a protective material with a thickness of about 0.075 to 0.1 mm. The reference numeral 60 denotes a second optical disc as an optical disc having a protective material with a thickness of about 0.6 mm.

The operation of the optical head 30 which writes or reads information to/from the first optical disc 50 will be described using FIG. 1. The blue-violet laser beam emitted from the light source 1 passes through the beam splitter 3 and is then converted to a substantially parallel beam by the collimate lens 4. The blue-violet laser beam passes through the hologram lens 5 and is then focused as a light spot onto an information recording surface of the first optical disc 50 beyond a protective material by the objective lens 6. The blue-violet laser beam in a returning path reflected on the information recording surface of the first optical disc 50 passes through the objective lens 6, the hologram lens 5, and the collimate lens 4 in the same optical path as an advancing path. The blue-violet laser beam in the returning path is reflected by the beam splitter 3 and is then given predetermined astigmatism by the detecting lens 8. The blue-violet laser beam in the returning path is led to the light receiving device 9 so as to generate an information signal and a servo signal.

The operation of the optical head 30 which writes or reads information to/from the second optical disc 60 will be described with reference to FIG. 2. The blue-violet laser beam emitted from the light source 1 passes through the beam splitter 3 and is then converted to a substantially parallel beam by the collimate lens 4. The blue-violet laser beam is diffracted by the hologram lens 5 and is then focused as a light spot onto an information recording surface of the second optical disc 60 beyond a protective material by the objective lens 6. The blue-violet laser beam in a returning path reflected on the information recording surface of the second optical disc 60 passes through the objective lens 6, the hologram lens 5, and the collimate lens 4 in the same optical path as an advancing path. The blue-violet laser beam in the returning path is reflected by the beam splitter 3 and is then given predetermined astigmatism by the detecting lens 8. The blue-violet laser beam in the returning path is led to the light receiving device 9 so as to generate an information signal and a servo signal.

A focus error signal for write or read of the first optical disc 50 and the second optical disc 60 can be detected by using an astigmatism method of detecting a focal spot given the astigmatism by the detecting lens 8 on a four-part split light receiving pattern of the light receiving device 9. A tracking error signal can be detected by using so-called a three-beam method and a differential push-pull method (DPP method) using a main beam and a sub-beam generated by a diffraction grating (not shown).

Figure 3:
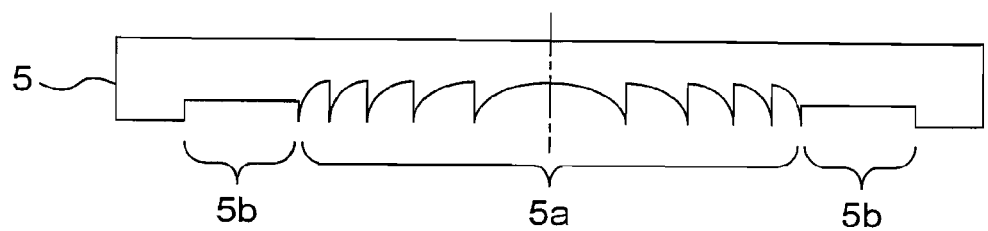
FIG. 3 is a diagram schematically showing the configuration of a hologram lens according to Embodiment 1 of the present invention.
Figure 18:
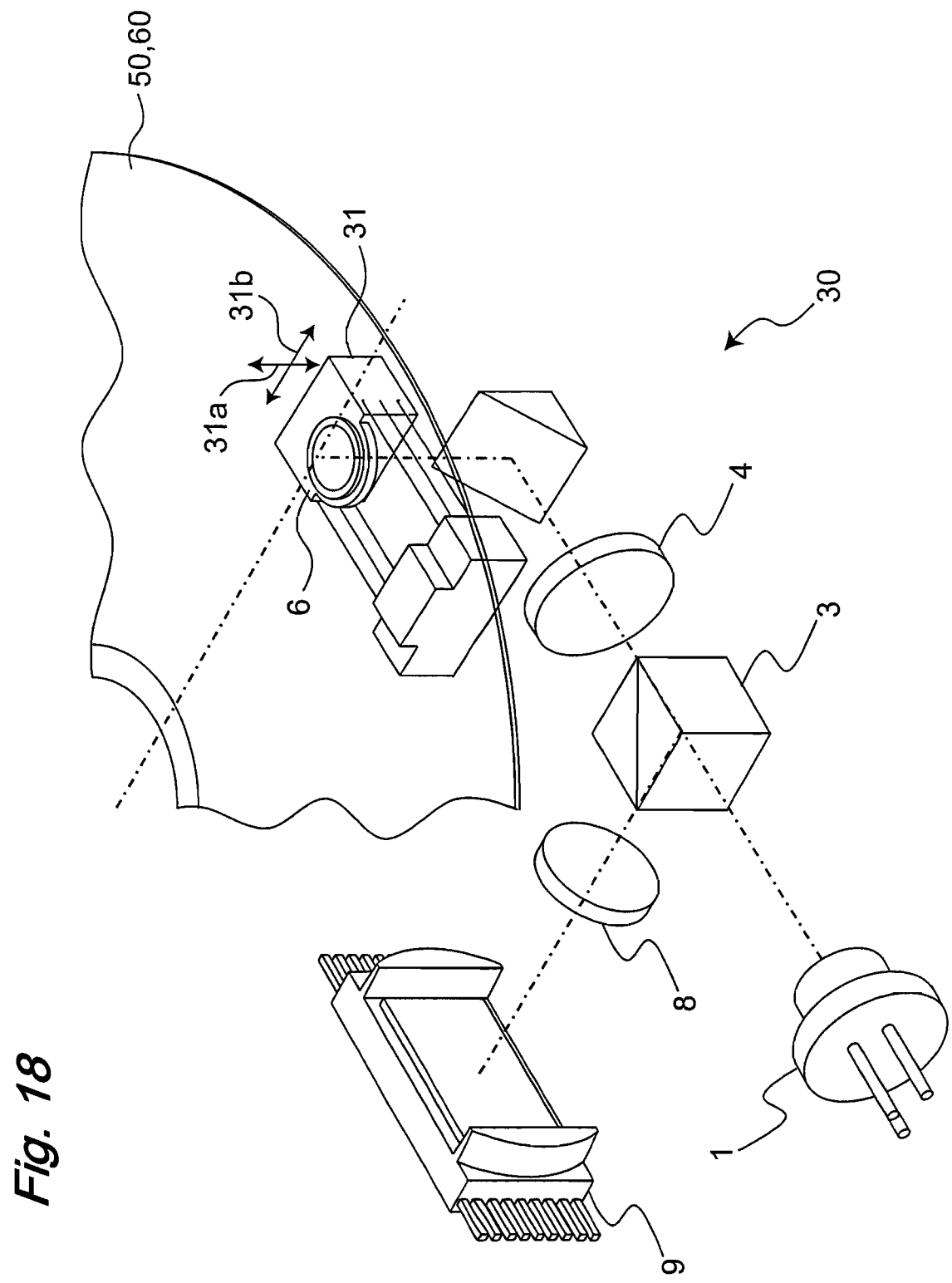
FIG. 18 is a perspective view showing an example of the schematic arrangement state of the component portions of the optical head shown in FIG. 1.

The functions of the hologram lens 5 and the objective lens 6 will be described in detail using FIGS. 3 and 4. In the optical head 30 shown in FIGS. 1 and 2, the hologram lens 5 and the objective lens 6 are united as shown in FIG. 18 and can be integrally driven by an actuator 31 in a focus direction 31a and a tracking direction 31b without changing the position relation between them. The actuator 31 is operation-controlled by a control unit 402 to which the servo signal generated by the light receiving device 9 is fed. The control unit 402 is provided in the optical disc apparatus having the optical head 30 explained as later-described Embodiment 4.

The hologram lens 5 is formed with a concentric grating pattern 5a. Its center, that is, the optical axis is matched with the objective lens 6 within an assembly error. The grating pattern of the hologram lens 5 is formed only in the portion having a diameter smaller than an aperture determined by the objective lens 6. No diffraction thus occurs in the portion not formed with the grating pattern of the hologram lens 5 at all.

The phase of a zero-order diffraction light (transmission light) in the grating pattern 5a has an average value of the amount of phase modulation given by the grating pattern 5a. It is desired that this be substantially matched with the phase of the transmission light in a region 5b without the grating pattern, thereby improving the focusing performance. For instance, when the grating pattern of the hologram lens 5 is of relief type, as shown in FIG. 3, it is desired that the height of the surface of the region 5b without the grating pattern be matched with the substantially average level of the concaves and convexes forming the grating pattern 5a.

The diffraction efficiency of a plus-first-order diffraction light of the hologram lens 5 is less than 100%. The hologram lens 5 is designed in such a manner that the transmission light (zero-order diffraction light) has sufficient intensity. The hologram lens 5 is blazed so as to increase the sum of the amount of the zero-order diffraction light and the plus-first-order diffraction light. Therefore the light utilization efficiency can be high.

When the hologram lens 5 is used in the optical head only for read of both the first optical disc 50 and the second optical disc 60, it is desired that the diffraction efficiency of the plus-first-order diffraction light be about 30 to 70%. The diffraction efficiency is set in this manner, so that information can be read from the first optical disc 50 and the second optical disc 60 by using a substantially equal amount of light. Thus the output of the light source can be reduced.

When the hologram lens 5 is used in the optical head which performs only read of the second optical disc 60 and can perform write and read of the first optical disc 50, it is desired that the diffraction efficiency of the plus-first-order diffraction light be 30% or below. The diffraction efficiency is set in this manner, so that the transmittance (the diffraction efficiency of the zero-order diffraction light) of the hologram lens 5 can be increased. Accordingly, the light utilization efficiency with respect to the first optical disc 50 for write can be high. The output of the light source at write can be reduced.

Figure 4A:
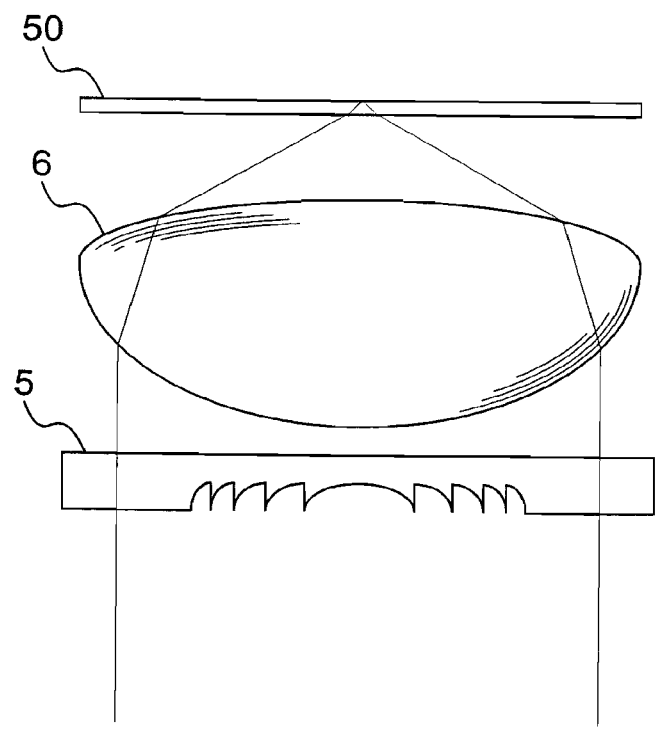
FIGS. 4A and 4B are diagrams showing the functions of the hologram lens and an objective lens according to Embodiment 1 of the present invention.

The objective lens 6 has an NA of 0.85 and is designed so as to form a focal spot onto the first optical disc 50 having the protective material thickness of about 0.1 mm to diffraction limit, as shown in FIG. 4A, when the laser beam passed through the hologram lens 5 without being diffracted (that is, the zero-order diffraction light) is incident.

Figure 4B:
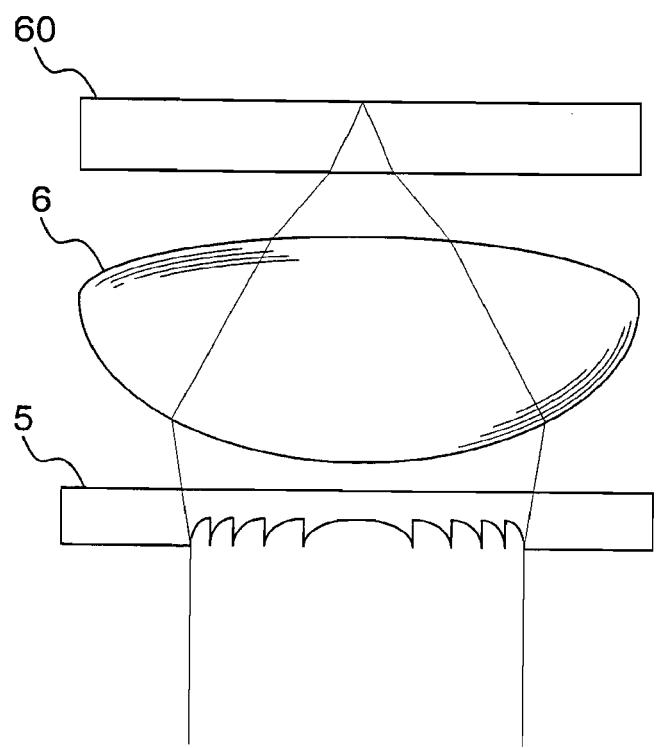

As shown in FIG. 4B, the plus-first-order diffraction light diffracted by the hologram lens 5 is focused onto the second optical disc 60 by the objective lens 6. Here, the plus-first-order diffraction light is aberration-corrected so as to form a focal spot onto the second optical disc 60 having the protective material thickness of about 0.6 mm to diffraction limit.

The hologram lens 5 for diffracting part of the incident light is combined with the objective lens 6 so as to realize a bifocal lens which can form a focal spot focused onto each of the optical discs having different protective material thicknesses to diffraction limit.

The hologram lens 5 of this embodiment has the effect of adding the concave lens power to the plus-first-order diffraction light with respect to the zero-order diffraction light. Thus the focal position of the plus-first-order diffraction light passing through the objective lens 6 is farther than that of the zero-order diffraction light. When the plus-first-order diffraction light is focused onto the information recording surface of the second optical disc 60 having the protective material thickness larger than that of the first optical disc 50, a working distance (WD) as the interval between the second optical disc 60 and the objective lens 6 can be sufficiently secured.

As described above, the hologram lens 5 provides the concave lens action to the plus-first-order diffraction light. Thus, the positions in the optical axis direction of two focal points of the zero-order diffraction light for write or read of the first optical disc 50 and the plus-first-order diffraction light for write or read of the second optical disc 60 are different. Accordingly, when information is written or read using a light spot formed on one of the focal points, a light spot focused on the other focal point is enlarged, which does not affect write or read of information.

When the grating pattern is formed so as to generate the desired plus-first-order diffraction light by the hologram lens 5, in addition to the zero-order diffraction light and the plus-first-order diffraction light, a minus-first-order diffraction light conjugating with the plus-first-order diffraction light and a higher order diffraction light are generated. For example, the hologram lens 5 of this embodiment, when the diffraction efficiency of the zero-order diffraction light (transmission efficiency) is about 65% and the diffraction efficiency of the plus-first-order diffraction light is about 15%, the diffraction efficiency of the minus-first-order diffraction light is about 10%.

As shown in FIG. 5, a thing used for read and write of the first optical disc is a light spot (in the drawing, a "signal light B") which is formed by the laser beam passing through the hologram lens 5 in the advancing path (zero-order diffraction light in the advancing path), reflected on the information recording surface, then passing through the hologram lens 5 again in the returning path (zero-order diffraction light in the returning path), and finally detected by the light receiving device.

On the other hand, a thing used for read and write of the second optical disc is a light spot (in the drawing, a "signal light H") which is formed by the laser beam passing through the hologram lens 5 in the advancing path (plus-first-order diffraction light in the advancing path), reflected on the information recording surface, then passing through the hologram lens 5 again in the returning path (plus-first-order diffraction light in the returning path), and finally detected by the light receiving device.

Other light spots detected by the light receiving device (that is, stray lights) only in a combination of the zero-order diffraction light, the plus-first-order diffraction light, and the minus-first-order diffraction light are:

stray light (1) (advancing path: zero-order diffraction light by transmission→returning path: plus-first-order diffraction light by diffraction);

stray light (2) (advancing path: plus-first-order diffraction light by diffraction→returning path: zero-order diffraction light by transmission);

stray light (3) (advancing path: minus-first-order diffraction light by diffraction→returning path: plus-first-order diffraction light by diffraction);

stray light (4) (advancing path: plus-first-order diffraction light by diffraction→returning path: minus-first-order diffraction light by diffraction);

stray light (5) (advancing path: minus-first-order diffraction light by diffraction→returning path: zero-order diffraction light by transmission);

stray light (6) (advancing path: zero-order diffraction light by transmission→returning path: minus-first-order diffraction light by diffraction); and stray light (7) (advancing path: minus-first-order diffraction light by diffraction→returning path: minus-first-order diffraction light by diffraction).

Thus, seven patterns of the stray lights exist.

In FIG. 5, the number described under the signal light or the stray light indicate the total efficiency in the advancing path and the returning path. In the signal light B used for write or read of the first optical disc, the amount of light contributing to actual write or read includes the amount of light passing through the region without the grating pattern. However, the efficiency shown in FIG. 5 does not include the amount of light passing through the region without the grating pattern.

The unnecessary diffraction lights not contributing to write or read of the first optical disc and the second optical disc (the stray lights (1) to (7)) are greatly defocused onto the information recording surface and become a very large light spot on the light receiving device, which is not substantially a problem when the write or read is performed to the first optical disc and the second optical disc.

Figure 6:
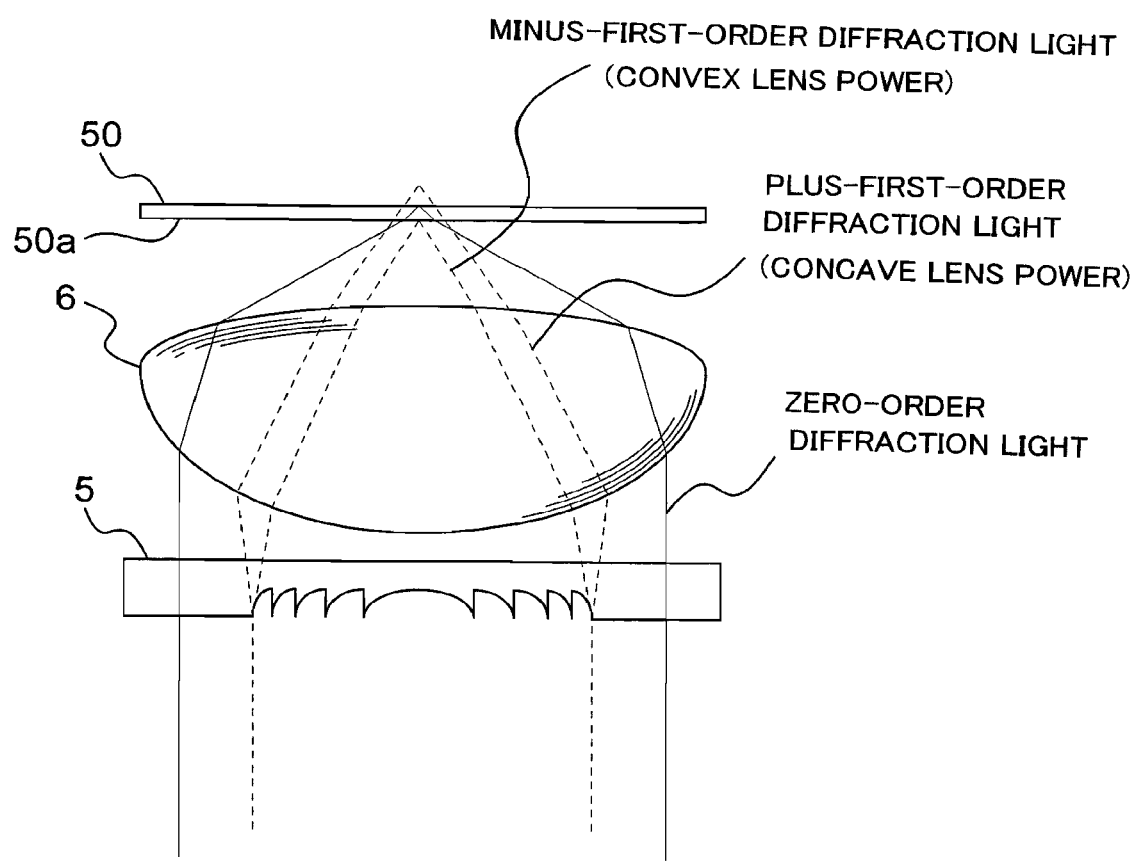
FIG. 6 is a diagram schematically showing the relation between a plus-first-order diffraction light, a zero-order diffraction light, and a minus-first-order diffraction light at write or read of the first optical disc according to Embodiment 1 of the present invention.

As shown in FIG. 6, the minus-first-order diffraction light conjugating with the plus-first-order diffraction light having the concave lens power has the convex lens power. So, the focal position of the minus-first-order diffraction light is closer to the objective lens 6 than that of the zero-order diffraction light.

When the focal position of the minus-first-order diffraction light having the convex lens power formed by the hologram lens 5 is matched with an optical disc surface 50a, the stray light (7) (advancing path: minus-first-order diffraction light by diffraction→returning path: minus-first-order diffraction light by diffraction) is focused onto the light receiving device.

When the focal position of the minus-first-order diffraction light is closer to the objective lens 6 than to the optical disc surface 50a, the stray light (5) (advancing path: minus-first-order diffraction light by diffraction→returning path: zero-order diffraction light by transmission) or the stray light (6) (advancing path: zero-order diffraction light by transmission→returning path: minus-first-order diffraction light by diffraction) can be focused as a small light spot onto the light receiving device under a predetermined condition.

Figure 19:
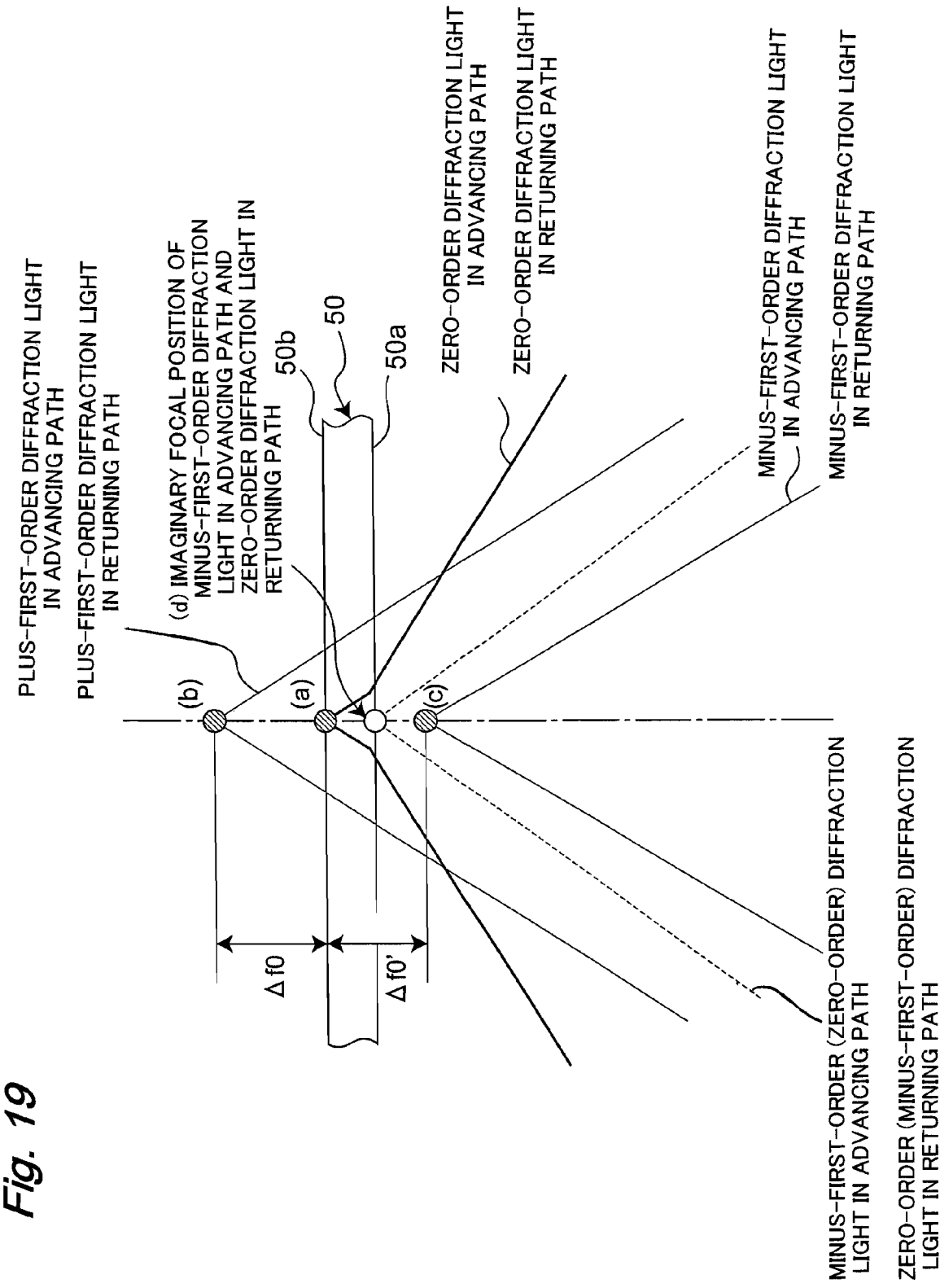
FIG. 19 is an enlarged view showing the vicinity of the focal positions of the plus-first-order diffraction light, the zero-order diffraction light, and the minus-first-order diffraction light of the first optical disc shown in FIG. 6.

When the objective lens 6 of this embodiment is used, as shown in FIG. 19 (the enlarged view in the vicinity of the focal positions of FIG. 6), three points on which the laser beam is actually focused in the vicinity of an information recording surface 50b of the first optical disc 50 are the focal position (a) of the zero-order diffraction light, the focal position (b) of the plus-first-order diffraction light, and the focal position (c) of the minus-first-order diffraction light. The focal positions (a) to (c) are conjugate points on the optical disc side of the "signal light B" (advancing path: zero-order diffraction light by transmission→returning path: zero-order diffraction light by transmission), the stray light (3) (advancing path: minus-first-order diffraction light by diffraction→returning path: plus-first-order diffraction light by diffraction), and the stray light (7) (advancing path: minus-first-order diffraction light by diffraction→returning path: minus-first-order diffraction light by diffraction), which are focused onto the light receiving device 9.

As described above, the conjugate point on the optical disc side of the stray light (5) (advancing path: minus-first-order diffraction light by diffraction→returning path: zero-order diffraction light by transmission) and the stray light (6) (advancing path: zero-order diffraction light by transmission→returning path: minus-first-order diffraction light by diffraction), focused as small light spots onto the light receiving device 9, is the position of (d). Although the stray light (5) and the stray light (6) are not actually focused at the position (d), they are focused as small light spots onto the light receiving device 9. Seen from the light receiving device 9, the position (d) can be regarded as an imaginary focal position.

Thus as shown in FIG. 19, when the focal position (a) of the zero-order diffraction light is matched with the information recording surface 50$b$ of the first optical disc 50 and the focal position (c) of the minus-first-order diffraction light is in the position as shown in FIG. 19, the imaginary focal position (d) of the stray light (5) and the stray light (6) is matched with the surface 50$a$ of the first optical disc 50 and its reflection light is focused onto the light receiving device.

When the diffraction efficiencies of the zero-order diffraction light, the plus-first-order diffraction light, and the minus-first-order diffraction light are set as shown in FIG. 5, the focal spots of the stray light (5) and the stray light (6) have the amount of light larger than that of the focal spot of the stray light (7). The stray light (5) and the stray light (6) pass in the substantially same optical path so as to be overlapped with each other on the light receiving device 9. The ratio of the amount of light of the stray light (5) and the stray light (6) to the signal light B as the light spot substantially used for write or read is as much as about 30%. From the viewpoint of stabling the servo signal and the information signal, the influence of interference between the stray lights and the signal lights cannot be neglected.

The minus-first-order diffraction light conjugating with the plus-first-order diffraction light is uniquely determined by the design of the plus-first-order diffraction light. Thus, the position relation between the plus-first-order diffraction light and the zero-order diffraction light need to be appropriately set in such a manner that the stray light due to the unnecessary diffraction light does not form a small optical spot on the light receiving device. As described below, specifically, the hologram lens 5 and the objective lens 6 are designed so as to appropriately set a WD1 and a WD2 of the first optical disc 50 and the second optical disc 60.

Figure 20:
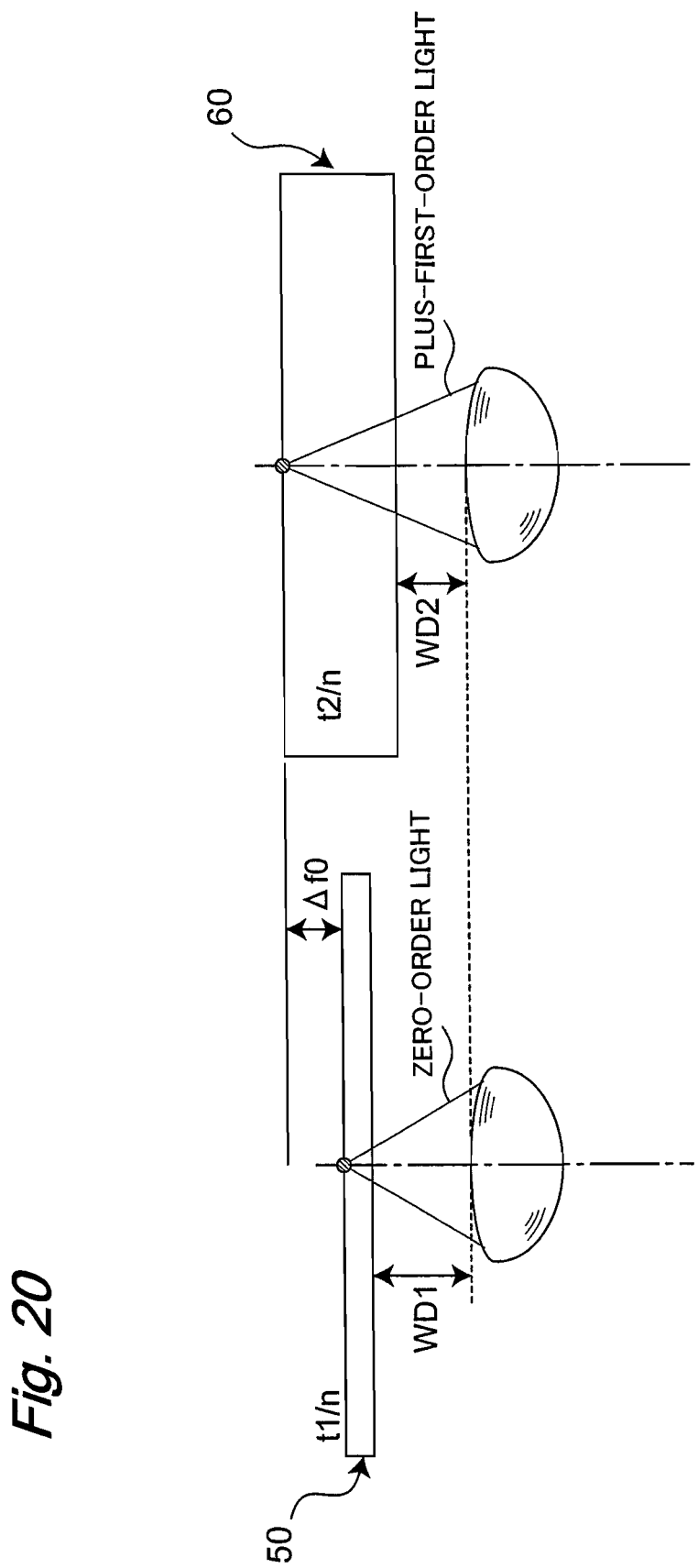
FIG. 20 is a diagram of assistance in explaining the difference between the focal position of the zero-order diffraction light of the first optical disc shown in FIG. 6 and the focal position of the plus-first-order diffraction light of the second optical disc shown in FIG. 8.

Here, with reference to FIG. 20, the design protective material thickness of the first optical disc is t1, the design protective material thickness of the second optical disc is t2, the working distance of the first optical disc is WD1, the working distance of the second optical disc is WD2, and the refractivity of the protective material is n. The optical length of the protective material thickness t having the refractivity n is t/n. As apparent from FIG. 20, the difference (a converted length in the air) Δf0 between the focal position of the plus-first-order diffraction light and the focal position of the zero-order diffraction light is as follows:

since $(t1/n)+WD1+\Delta f0=(t2/n)+WD2$ then $\Delta f0=((t2/n)+(WD2))-((t1/n)+(WD1))$ (Equation 1)

The difference (a converted length in the air) Δf0' between the focal position of the minus-first-order diffraction light conjugating with the plus-first-order diffraction light and the focal position of the zero-order diffraction light will be considered as follows.

When the focal length of the objective lens 6 having the convex lens power is f_o1 and the focal length of the plus-first-order diffraction light of the hologram lens 5 having the concave lens power is f_doe (<0), the focal length of the minus-first-order diffraction light conjugating with the plus-first-order diffraction light and having the convex lens power is −f_doe (>0). The synthetic focal length fs of the plus-first-order diffraction light and the synthetic focal length fs_inv (minus-first-order diffraction light) of the minus-first-order diffraction light of the objective lens 6 and the hologram lens 5 are expressed, with a lens interval d, by $fs=f\_o1\times f\_doe/(f\_o1+f\_doe+d)$ (Equation 2)

$fs\_inv=-(f\_o1\times f\_doe)/(f\_o1-f\_doe+d)$ (Equation 3)

The difference (the converted length in the air) Δf0 between the focal position of the plus-first-order diffraction light and the focal position of the zero-order diffraction light is not equal to the difference (the converted length in the air) Δf0' between the focal position of the minus-first-order diffraction light and the focal position of the zero-order diffraction light.

$\Delta f0'=f0-k$ (Equation 4)

(k is the focal position interval difference between the plus-first-order diffraction light and the minus-first-order diffraction light uniquely determined by an optical system configured by the objective lens 6 and the hologram lens 5)

Then, $\Delta f0'=(t2/n+(WD2))-(t1/n+(WD1))-k$ (Equation 5)

Here, the signal light B (advancing path: zero-order diffraction light by transmission→returning path: zero-order diffraction light by transmission) for write or read of the optical disc having a small protective material thickness (the first optical disc 50) and the stray light (5) (advancing path: minus-first-order diffraction light by diffraction→returning path: zero-order diffraction light by transmission) or the stray light (6) (advancing path: zero-order diffraction light by transmission→returning path: minus-first-order diffraction light by diffraction) are overlapped with each other on the light receiving device 9 when the substantially half of the difference Δf0 in the focal position is matched with a converted length in the air Δd1_air of the interval between the information recording surface and the surface of the optical disc.

When the first protective material thickness of the first optical disc is t1_L1 and the second protective material thickness of the first optical disc is t1_L2, the converted length in the air Δd1_air_L1 and Δd1_air_L2 are expressed by $\Delta d1\_air\_L1=t1\_L1/n$ (Equation 6)

$\Delta d1\_air\_L2=t1\_L2/n$ (Equation 7)

Each of the first protective material thickness and the second protective material thickness is an actual protective material thickness when there are two information recording surfaces in one optical disc. Each of them includes a thickness error. The design protective material thicknesses t1 and t2, as described above, are protective material thicknesses used for designing the objective lens and have a concept different from that of the first protective material thickness and the second protective material thickness.

Noting Δf0' shown in FIG. 19, when Δf0'/2 is matched with the first protective material thickness t1_L1 or the second protective material thickness t1_L2, the signal light B and the stray light (5) or the stray light (6) are overlapped with each other on the light receiving device 9. The overlapping conditions are expressed by the following equations 10 and 11.

$$\Delta f0' = 2 \times t1\_L1/n \text{ or } \Delta f0' = 2 \times t1\_L2/n$$

$$(t2/n + (WD2)) - (t1/n + (WD1)) - k = 2 \times t1\_L1/n \quad \text{(Equation 8)}$$

$$(t2/n + (WD2)) - (t1/n + (WD1)) - k = 2 \times t1\_L2/n \quad \text{(Equation 9)}$$

Then, $$WD1 - WD2 = (t2 - t1 - (2 \times t1\_L1))/n - k \quad \text{(Equation 10)}$$

and $$WD1 - WD2 = (t2 - t1 - (2 \times t1\_L2))/n - k \quad \text{(Equation 11)}$$

Here, a specific example is shown.

The design protective material thickness of the first optical disc is t1=0.0875 mm, the first protective material thickness of the first optical disc is t1_L1=0.1±0.005 mm (the first layer), the second protective material thickness of the first optical disc is t1_L2=0.075±0.005 mm (the second layer), the design protective material thickness of the second optical disc is t2=0.6 mm, the refractivity of the protective material is n=1.6164, and the focal position interval difference of the plus-first-order diffraction light and the minus-first-order diffraction light is k=−0.03 mm.

The condition in which the signal light B and the stray light (5) or the stray light (6) are overlapped with each other on the light receiving device 9 is:

$$WD1 - WD2 = 0.223 \pm 0.007 \text{ mm}$$

or $$WD1 - WD2 = 0.254 \pm 0.007 \text{ mm}$$

When the working distance WD1 of the first optical disc 50 is 0.5 mm, the working distance WD2 of the second optical disc 60 should not be set to near 0.277 mm and 0.246 mm.

Desirably, $$WD1 - WD2 \neq (t2 - t1 - (2 \times t1\_L1))/n - k \quad \text{(Equation 12)}$$

and $$WD1 - WD2 \neq (t2 - t1 - (2 \times t1\_L2))/n - k \quad \text{(Equation 13)}$$

The overlap of the signal light B with the stray light (5) or the stray light (6) on the light receiving device means that the focus error signals appear so as to be overlapped with each other.

Figure 7:
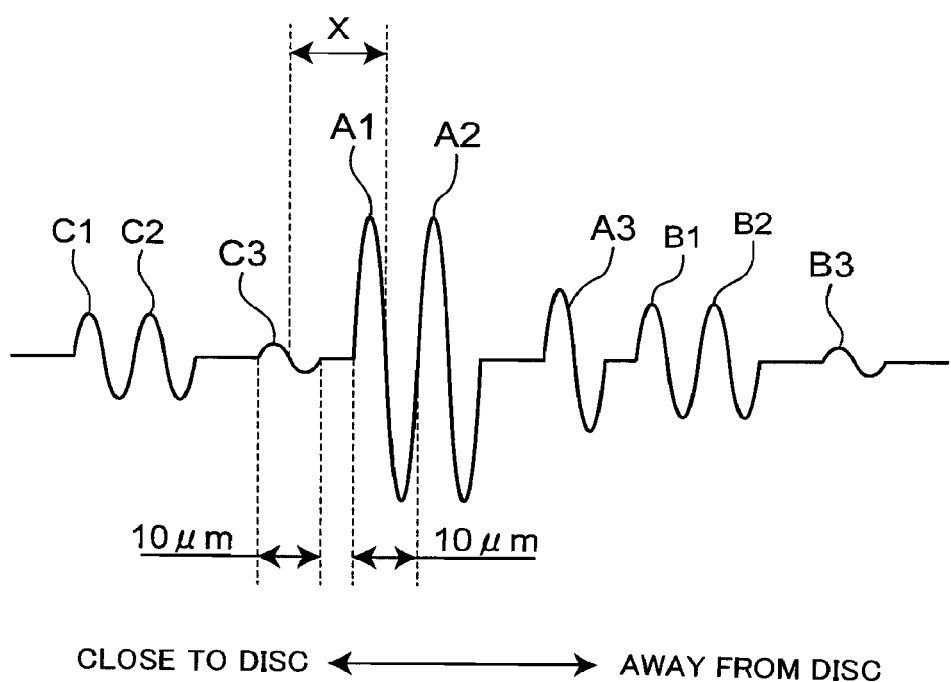
FIG. 7 is a diagram schematically showing focus error signals at write or read of the first optical disc or so-called S-shaped signals according to the present invention.

FIG. 7 schematically shows the focus error signals (so-called S-shaped signals) at write or read of the first optical disc 50 in the optical head 30 of this embodiment. In FIG. 7, the horizontal axis shows the amount of defocus, in which the right side shows the direction in which the objective lens 6 and the optical disc 50 are moved away from each other and the left side shows the direction in which the objective lens 6 and the optical disc 50 are brought close to each other. The vertical axis shows the focus error signal level. The actual focus error signals are asymmetric due to the influence of spherical aberration. Without considering it, FIG. 7 schematically shows the focus error signals.

In FIG. 7, A1 is the S-shaped signal obtained by reflection of the signal light B on the information recording surface having a protective material thickness of 0.100 mm, A2 is the S-shaped signal obtained by reflection of the signal light B on the information recording surface having a protective material thickness of 0.075 mm, A3 is the S-shaped signal obtained by reflection of the signal light B on the disc surface, B1 is the S-shaped signal obtained by reflection of the stray light (1) and the stray light (2) on the information recording surface having a protective material thickness of 0.100 mm, B2 is the S-shaped signal obtained by reflection of the stray light (1) and the stray light (2) on the information recording surface having a protective material thickness of 0.075 mm, B3 is the S-shaped signal obtained by reflection of the stray light (1) and the stray light (2) on the disc surface, C1 is the S-shaped signal obtained by reflection of the stray light (5) and the stray light (6) on the information recording surface having a protective material thickness of 0.100 mm, C2 is the S-shaped signal obtained by reflection of the stray light (5) and the stray light (6) on the information recording surface having a protective material thickness of 0.075 mm, and C3 is the S-shaped signal obtained by reflection of the stray light (5) and the stray light (6) on the disc surface.

Noting one information recording surface or surface, as the objective lens 6 is brought close to the disc, the S-shaped signals appear in the order of:

the S-shaped signal obtained by reflection of the stray light (1) and the stray light (2)

the S-shaped signal obtained by reflection of the signal light B the S-shaped signal obtained by reflection of the stray light (5) and the stray light (6)

The S-shaped signal by the stray light (3) and the stray light (4) is substantially overlapped with the S-shaped signals (A1, A2, and A3) by the signal light B, which is not a problem since the relative amount of light of the stray lights (3) and (4) is small. The S-shaped signal by the stray light (7) is not a problem since it has the small relative amount of light and appears in the position farther from the signal light B than the S-shaped signals (C1, C2, and C3) by the stray light (5) and the stray light (6).

The signal light H (FIG. 5) becomes a stray light for write or read of the first optical disc 50, which is not a problem since it has the small relative amount of light and appears in the position farther from the signal light B than the S-shaped signals (B1, B2, and B3) by the stray light (1) and the stray light (2).

The above conditions $$WD1 - WD2 \neq (t2 - t1 - (2 \times t1\_L1))/n - k \quad \text{(Equation 12)}$$

and $$WD1 - WD2 \neq (t2 - t1 - (2 \times t1\_L2))/n - k \quad \text{(Equation 13)}$$

are conditions in which the zero cross points of the S-shaped signal A1, the S-shaped signal A2, and the S-shaped signal C3 are not matched with each other. However, to sufficiently reduce the influence of the S-shaped signal C3 with respect to the S-shaped signal A1 and the S-shaped signal A2, the interval between the S-shaped signal A1 and the S-shaped signal C3 may be increased above the condition of the Equation 12.

Specifically, the range in which the S-shaped signal A1 appears (e.g., the range of above ±5 μm (converted in the air) with respect to the zero cross point of the S-shaped signal A1) and the range in which the S-shaped signal C3 appears (e.g., the range of above ±5 μm (converted in the air) with respect to the zero cross point of the S-shaped signal C1) should not be overlapped with each other. When the amount of margin for non-overlapping is X, (WD1−WD2) should be as follows.

$$WD1 - WD2 < (t2 - t1 - (2 \times t1\_L1))/n - k - X \quad \text{(Equation 14)}$$

When the amount of margin X is set in such a manner that the range of above ±5 μm (converted in the air) with respect to the zero cross point of the S-shaped signal A1 and the range of above ±5 μm (converted in the air) with respect to the zero cross point of the S-shaped signal C1 are not overlapped with each other, X≧10 μm. It is desired that the amount of margin X with respect to the overlapped S-shaped signals be appropriately set according to an optical magnification.

For example, when X=0.01 mm, it is desired that WD1−WD2<0.207 mm. For example, when the working distance WD1 of the first optical disc 50 is 0.5 mm, it is desired that the working distance WD2 of the second optical disc 60 be larger than 0.293 mm.

The amount of margin X is set as described above, so that the S-shaped signal A1, the S-shaped signal A2, and other S-shaped signals (B1 to B3 and C1 to C3) are completely separated from each other. Thus, the influence of the stray light with respect to the S-shaped signal A1 and the S-shaped signal A2 can be substantially and sufficiently reduced.

Figure 8:
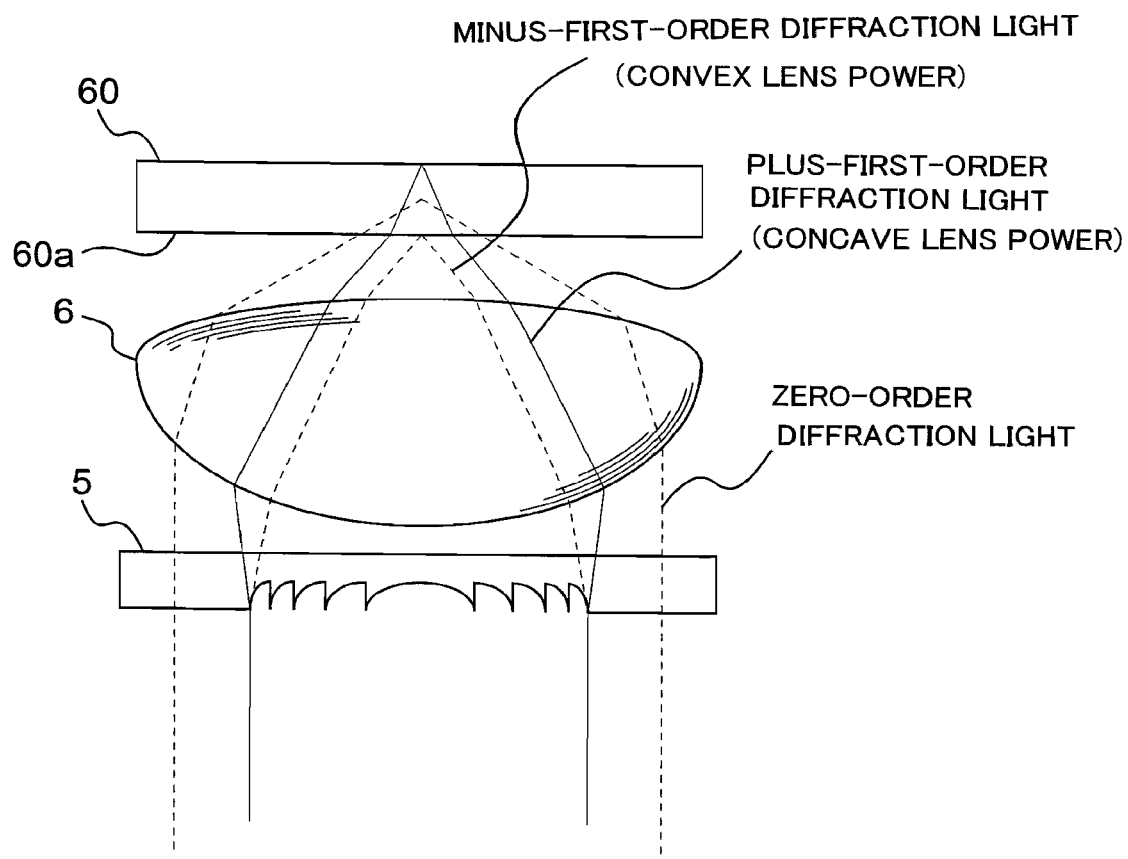
FIG. 8 is a diagram schematically showing the relation between a plus-first-order diffraction light, a zero-order diffraction light, and a minus-first-order diffraction light at write or read of the second optical disc according to Embodiment 1 of the present invention.

As shown in FIG. 8, at read of the second optical disc 60, the minus-first-order diffraction light conjugating with the plus-first-order diffraction light having the concave lens power has the convex lens power. Thus, the focal position of the minus-first-order diffraction light is closer to the objective lens 6 than the focal position of the zero-order diffraction light. When the focal position of the minus-first-order diffraction light having the convex lens power formed by the hologram lens 5 is matched with an optical disc surface 60a, the stray light (7) (advancing path: minus-first-order diffraction light by diffraction→returning path: minus-first-order diffraction light by diffraction) is focused onto the light receiving device 9.

Figure 9:
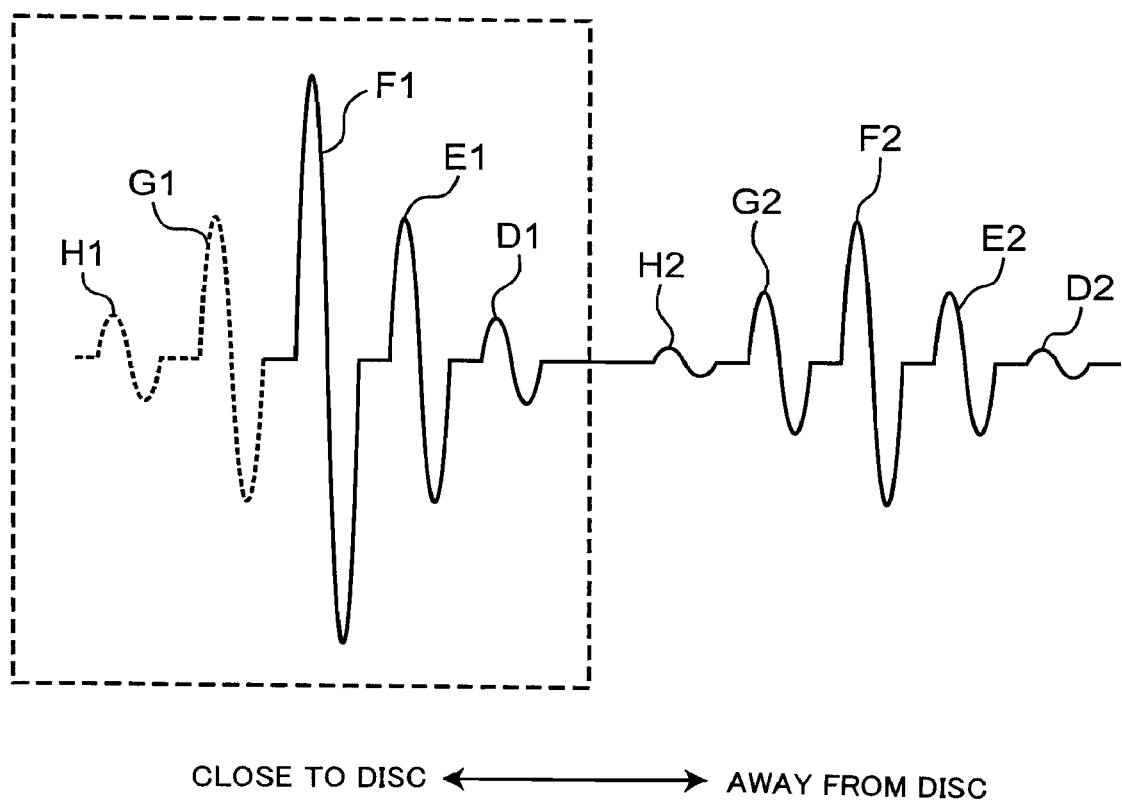
FIG. 9 is a diagram schematically showing focus error signals at write or read of the second optical disc or so-called S-shaped signals according to the present invention.

FIG. 9 schematically shows the focus error signals (so-called S-shaped signals) at read of the second optical disc 60 in the optical head 30 of this embodiment. In FIG. 9, the horizontal axis shows the amount of defocus, in which the right side shows the direction in which the objective lens 6 and the optical disc 60 are moved away from each other and the left side shows the direction in which the objective lens 6 and the optical disc 60 are brought close to each other. The vertical axis shows the focus error signal level. The actual focus error signals are asymmetric due to the influence of spherical aberration. Without considering it, FIG. 9 schematically shows the focus error signals.

In FIG. 9, D1 is the S-shaped signal obtained by reflection of the signal light H on the information recording surface having the protective material thickness of 0.6 mm, D2 is the S-shaped signal obtained by reflection of the signal light H on the disc surface, E1 is the S-shaped signal obtained by reflection of the stray light (1) and the stray light (2) on the information recording surface having the protective material thickness of 0.6 mm, E2 is the S-shaped signal obtained by reflection of the stray light (1) and the stray light (2) on the disc surface, F1 is the S-shaped signal obtained by reflection of the signal light B on the information recording surface having the protective material thickness of 0.6 mm, F2 is the S-shaped signal obtained by reflection of the signal light B on the disc surface, G1 is the S-shaped signal obtained by reflection of the stray light (5) and the stray light (6) on the information recording surface having the protective material thickness of 0.6 mm, G2 is the S-shaped signal obtained by reflection of the stray light (5) and the stray light (6) on the disc surface, H1 is the S-shaped signal obtained by reflection of the stray light (7) on the information recording surface having the protective material thickness of 0.6 mm, and H2 is the S-shaped signal obtained by reflection of the stray light (7) on the disc surface.

Noting one information recording surface or disc surface, as the objective lens 6 is brought close to the disc, the S-shaped signals appear in the order of:

the S-shaped signal obtained by reflection of the signal light H;

the S-shaped signal obtained by reflection of the stray light (1) and the stray light (2);

the S-shaped signal obtained by reflection of the signal light B;

the S-shaped signal obtained by reflection of the stray light (5) and the stray light (6); and the S-shaped signal obtained by reflection of the stray light (7).

(for the information recording surface, the S-shaped signals in the solid line in FIG. 9)

The S-shaped signal of the stray light (3) and the stray light (4) is substantially overlapped with the S-shaped signals (F1 and F2) of the signal light B. The S-shaped signal G1 and the S-shaped signal H1 do not appear since the disc and the objective lens are not brought close to each other any more (or collide with each other).

From FIG. 9, the interference between the S-shaped signal D1 and another S-shaped signal is a problem at read of the second optical disc 60. To avoid this, the S-shaped signal D1 and the S-shaped signal H2 should not be overlapped with each other. When the diffraction efficiencies of the zero-order diffraction light, the plus-first-order diffraction light, and the minus-first-order diffraction light are set as shown in FIG. 5, the ratio of the stray light (7) to the signal light H used for read is 40% or above. Thus, from the viewpoint of stabling the servo signal and the information signal, the interference between the S-shaped signal D1 and the S-shaped signal H2 cannot be allowed.

As described above, the design protective material thickness of the first optical disc is t1, the design protective material thickness of the second optical disc is t2, the working distance of the first optical disc is WD1, the working distance of the second optical disc is WD2, and the refractivity of the protective material is n. The difference Δf1 (a converted length in the air) between the focal position of the plus-first-order diffraction light and the focal position of the minus-first-order diffraction light may be thought to be the sum of the difference Δf0 (a converted length in the air) between the focal position of the plus-first-order diffraction light and the focal position of the zero-order diffraction light and the difference Δf0' (a converted length in the air) between the focal position of the minus-first-order diffraction light and the focal position of the zero-order diffraction light; that is, Δf1=Δf0+Δf0'

From Equation 4, $$\Delta f1 = 2 \times \Delta f0 - k$$

From Equation 1, $$\Delta f1 = \{(t2/n + WD2) - (t1/n + WD1)\} \times 2 - k \qquad \text{(Equation 15)}$$

Here, the condition that the signal light H (advancing path: plus-first-order diffraction light by diffraction→returning path: plus-first-order diffraction light by diffraction) for read of the optical disc having a large protective material thickness (the second optical disc 60) and the stray light (7) (advancing path: minus-first-order diffraction light by diffraction→returning path: minus-first-order diffraction light by diffraction) are overlapped with each other on the light receiving device is a case that the difference Δf1 between the focal positions is matched with the converted length in the air Δd2_air corresponding to the interval between the information recording surface and the surface of the optical disc.

When the protective material thickness of the second optical disc is t2_ra, the converted length in the air Δd2_air_ra is expressed by $$\Delta d2\_air\_ra = t2\_ra/n \quad \text{(Equation 16)}$$

Figure 21:
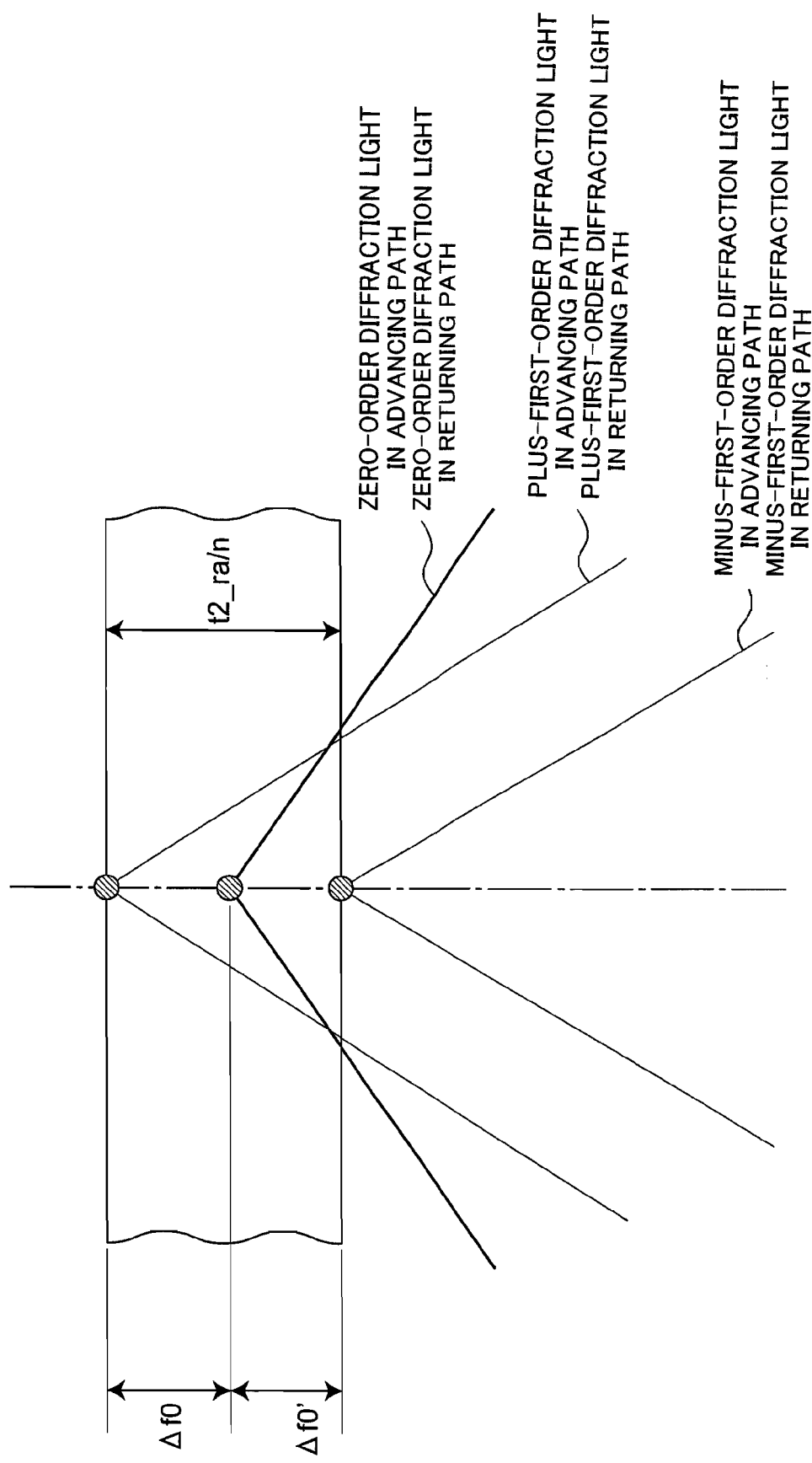
FIG. 21 is an enlarged view showing the vicinity of the focal positions of the plus-first-order diffraction light, the zero-order diffraction light, and the minus-first-order diffraction light of the second optical disc shown in FIG. 8.

The actual protective material thickness of the second optical disc is different from that of the first optical disc. Regardless of the number of the information recording surfaces of the disc, the range of variation in the protective material thickness of a first information recording surface and the range of variation in the protective material thickness of a second information recording surface are substantially matched with each other and are both in the range of t2 ra. Accordingly, the condition for overlapping the signal light H and the stray light (7) with each other on the light receiving device is a case, as apparent from FIG. 21, when Δf1 is matched with t2_ra/n (=Δd2_air_ra). So, $$\{(t2/n+(WD2))-(t1/n+(WD1))\} \times 2-k = t2\_ra/n \quad \text{(Equation 18)}$$

then $$WD1-WD2 = (2 \times t2 - 2 \times t1 - t2\_ra)/(2 \times n) - k \quad \text{(Equation 20)}$$

Here, the design protective material thickness of the first optical disc is t1=0.0875 mm, the design protective material thickness of the second optical disc is t2=0.6 mm, the protective material thickness of the second optical disc is 0.57≦t2_ra≦0.63 mm, the refractivity of the protective material is n=1.6164, and the focal position interval difference between the plus-first-diffraction light and the minus-first-order diffraction light is k=−0.03 mm. Under the above case, the condition in which the signal light H and the stray light (7) are overlapped with each other on the light receiving device is:

$$0.152 \text{ mm} \leq WD1-WD2 \leq 0.171 \text{ mm}$$

When the working distance WD1 of the first optical disc 50 is 0.5 mm, the working distance WD2 of the second optical disc 60 should not be set to 0.329 mm≦WD2≦0.348 mm.

Desirably, $$WD1-WD2 \neq (2 \times t2 - 2 \times t1 - t1\_ra)/(2 \times n) - k \quad \text{(Equation 22)}$$

These conditions are conditions in which the zero cross points of the S-shaped signal D1 and the S-shaped signal H2 are not matched with each other. However, to sufficiently reduce the influence of the S-shaped signal H2 with respect to the S-shaped signal D1, it is desired that the interval between the S-shaped signal A1 and the S-shaped signal C3 be decreased above the condition of Equation 23.

Specifically, the range in which the S-shaped signal D1 appears (e.g., the range of above ±5 μm converted in the air with respect to the zero cross point of the S-shaped signal D1) and the range in which the S-shaped signal H2 appears (e.g., the range of above ±5 μm converted in the air with respect to the zero cross point of the S-shaped signal H2) should not be overlapped with each other. When the amount of margin is X', it should be:

$$WD1-WD2 > (2 \times t2 - 2 \times t1 - (t1\_ra))/(2 \times n) - k + X' \quad \text{(Equation 24)}$$

When the amount of margin X' is set in such a manner that the range of above ±5 μm converted in the air with respect to the zero cross point of the S-shaped signal D1 and the range of above ±5 μm converted in the air with respect to the zero cross point of the S-shaped signal H2 are not overlapped with each other, X'≧10 μm. It is desired that the amount of margin X' with respect to the overlapped S-shaped signals be appropriately set according to an optical magnification.

For example, when X'=0.01 mm, it is desired that WD1−WD2>0.181 mm. For example, when the working distance WD1 of the first optical disc 50 is 0.5 mm, it is desired that the working distance WD2 of the second optical disc 60 be smaller than 0.319 mm.

By setting as described above, the S-shaped signal D1 and other S-shaped signals (D2 to H2) are completely separated from each other. Thus, the influence of the stray light on the S-shaped signal D1 can be substantially and sufficiently reduced.

When the second optical disc 60 has a plurality of information recording surfaces, a plurality of S-shaped signals according to the number of the information recording surfaces appear for the S-shaped signals D1, E1, F1, G1, and H1 in FIG. 9. Even when the second optical disc 60 has a plurality of information recording surfaces, the position relation between each of the S-shaped signals and other S-shaped signals is not changed. Accordingly, in this embodiment, the number of the information recording surfaces of the second optical disc 60 is not particularly described. The present invention is applicable to the second optical disc 60 having a plurality of information recording surfaces.

(Embodiment 2)

Figure 10:
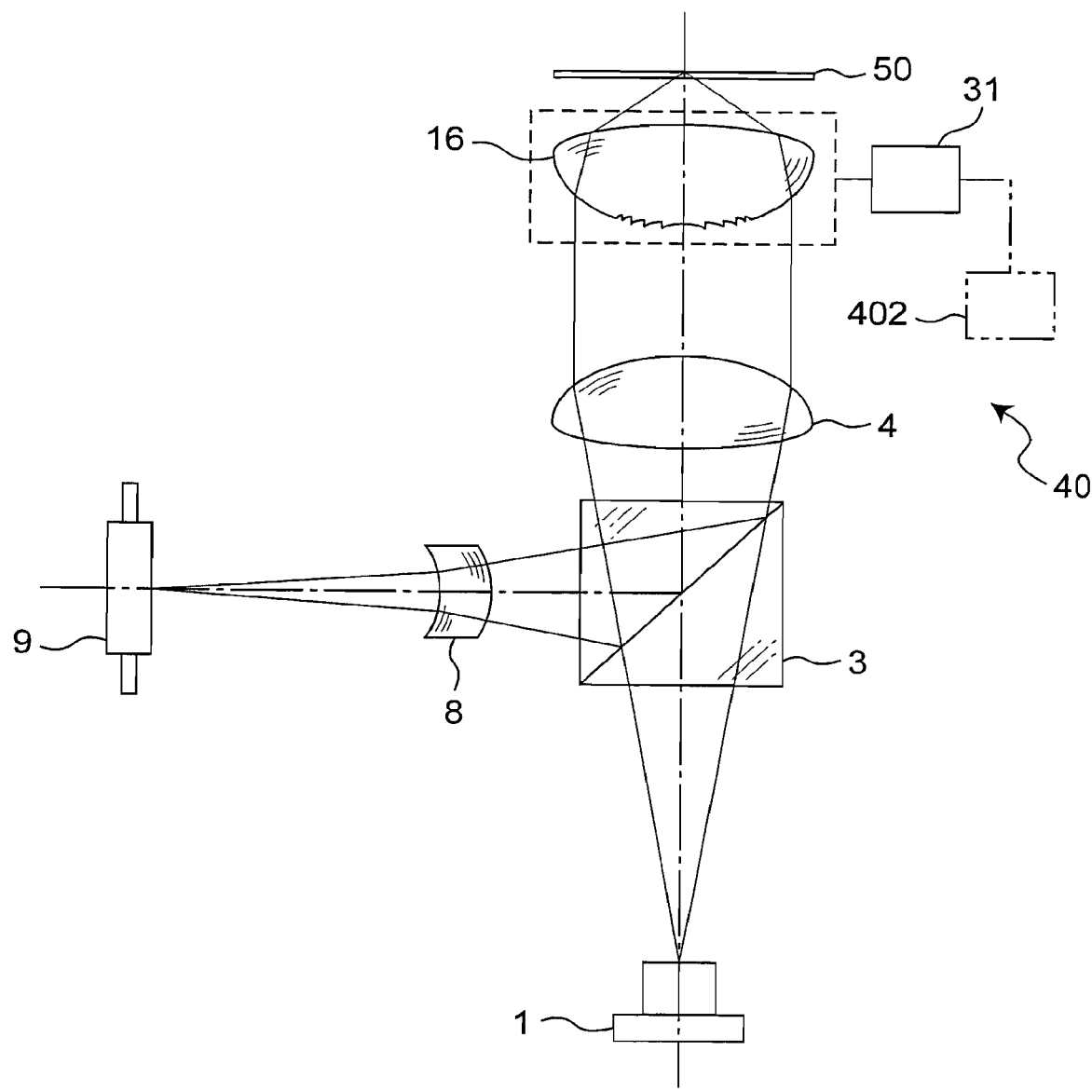
FIG. 10 is a schematic block diagram of an optical head for write or read of the first optical disc according to Embodiment 2 of the present invention.
Figure 11:
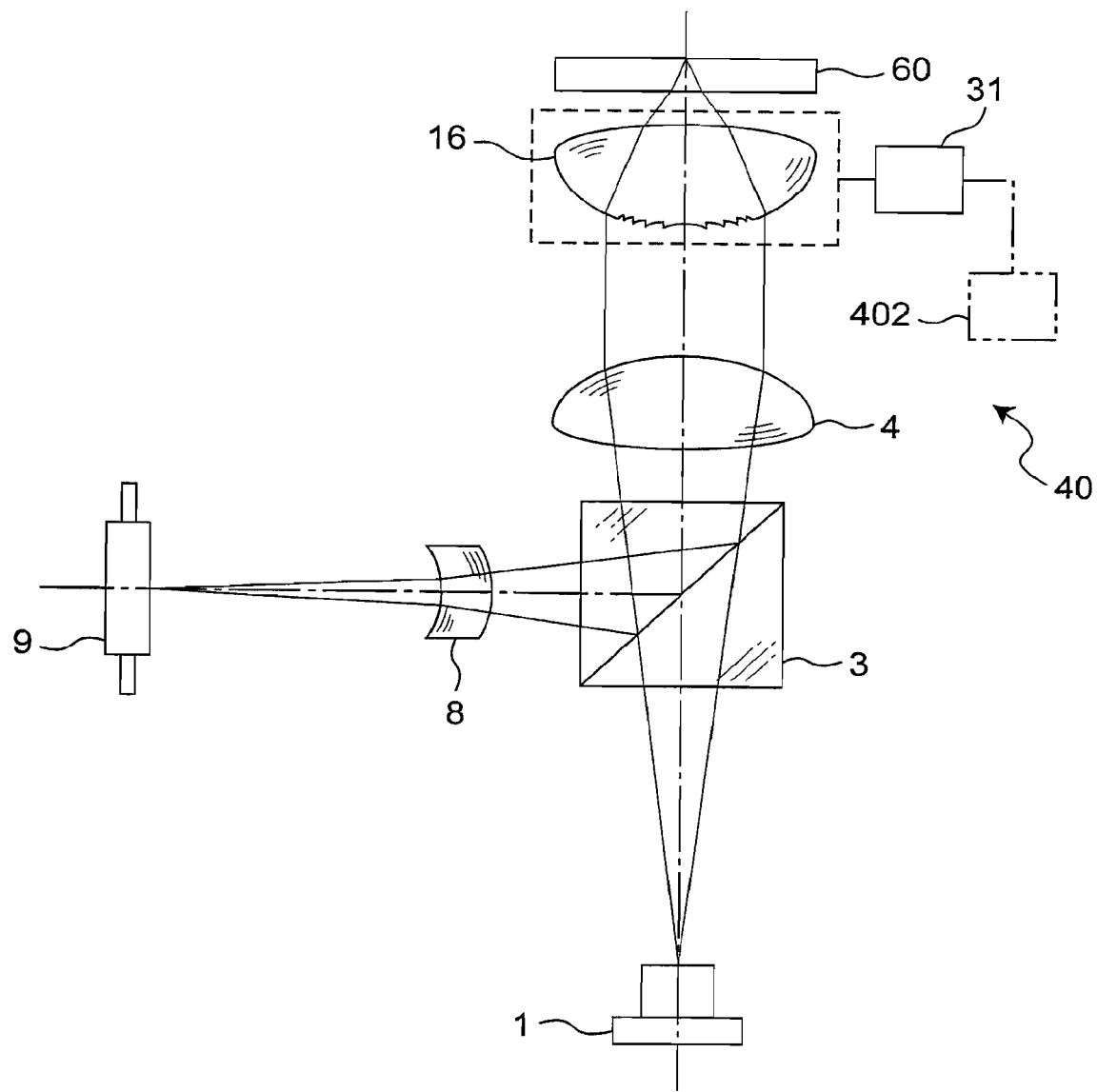
FIG. 11 is a schematic block diagram of the optical head for write or read of the second optical disc according to Embodiment 2 of the present invention.

FIGS. 10 and 11 are schematic block diagrams of an optical head 40 according to another embodiment of the present invention.

In FIGS. 10 and 11, the same components as those of Embodiment 1 are indicated by similar reference numerals and the description will be omitted below.

In FIGS. 10 and 11, the optical head 40 includes a light source 1 emitting a blue-violet laser beam, a beam splitter 3, a collimate lens 4, a hologram integrated type objective lens 16, a detecting lens 8, and a light receiving device 9 for receiving the laser beam. The reference numeral 50 denotes a first optical disc as an optical disc having a protective material with a thickness of about 0.075 to 0.1 mm. The reference numeral 60 denotes a second optical disc as an optical disc having a protective material with a thickness of about 0.6 mm.

The operation of the optical head 40 which writes or reads information to/from the first optical disc 50 will be described using FIG. 10. The blue-violet laser beam emitted from the light source 1 passes through the beam splitter 3 and is then converted to a substantially parallel beam by the collimate lens 4. The blue-violet laser beam is focused as a light spot onto the information recording surface of the first optical disc 50 beyond the protective material by the hologram integrated type objective lens 16. The blue-violet laser beam in a returning path reflected on the information recording surface of the first optical disc 50 passes through the hologram integrated type objective lens 16 and the collimate lens 4 in the same optical path as an advancing path. The blue-violet laser beam in the returning path is reflected by the beam splitter 3 and is then given predetermined astigmatism by the detecting lens 8. The blue-violet laser beam is led to the light receiving device 9 so as to generate an information signal and a servo signal.

The operation of the optical head 40 which writes or reads information to/from the second optical disc 60 will be described with reference to FIG. 11. The blue-violet laser beam emitted from the light source 1 passes through the beam splitter 3 and is then converted to a substantially parallel beam by the collimate lens 4. The blue-violet laser beam is diffracted and focused by the hologram integrated type objective lens 16 and is then focused as a light spot onto the information recording surface of the second optical disc 60 beyond the protective material. The blue-violet laser beam in a returning path reflected on the information recording surface of the second optical disc 60 passes through the hologram integrated type objective lens 16 and the collimate lens 4 in the same optical path as an advancing path. The blue-violet laser beam in the returning path is reflected by the beam splitter 3 and is then given predetermined astigmatism by the detecting lens 8. The blue-violet laser beam is led to the light receiving device 9 so as to generate an information signal and a servo signal.

Figure 12:
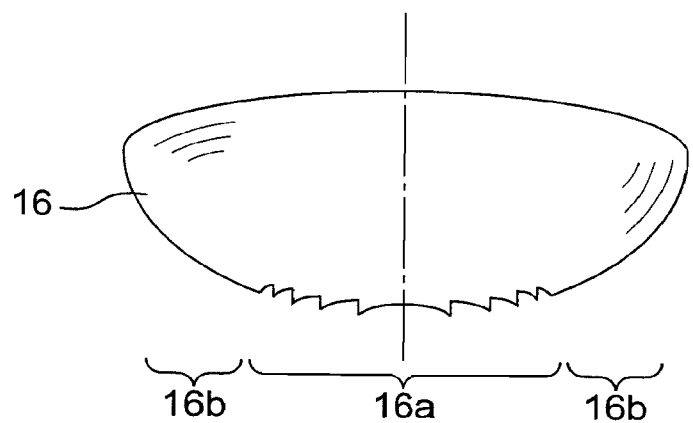
FIG. 12 is a diagram schematically showing the configuration of the hologram integrated type objective lens according to Embodiment 2 of the present invention.

The function of the hologram integrated type objective lens 16 will be described in detail with reference to FIGS. 12 and 13. As in Embodiment 1, the hologram integrated type objective lens 16 can be driven by the actuator 31 shown in FIG. 18 by control of the control unit 402 in the focus direction 31a and the tracking direction 31b.

The hologram integrated type objective lens 16 is formed with a concentric grating pattern 16a. Its center is matched with the optical axis of the hologram integrated type objective lens 16. The grating pattern 16a is formed only in the portion having a diameter smaller than an aperture determined by the hologram integrated type objective lens 16. No diffraction occurs in the portion not formed with the grating pattern 16a at all.

The diffraction efficiency of the plus-first-order diffraction light of the hologram integrated type objective lens 16 is less than 100%. The hologram integrated type objective lens 16 is designed in such a manner that the transmission light (zero-order diffraction light) has sufficient intensity. The hologram integrated type objective lens 16 is blazed so as to increase the sum of the amount of the zero-order diffraction light and the plus-first-order diffraction light. Thus the light utilization efficiency can be high.

When the hologram integrated type objective lens 16 is used as the optical head only for read of both the first optical disc 50 and the second optical disc 60, it is desired that the diffraction efficiency of the plus-first-order diffraction light be about 30 to 70%. By setting the diffraction efficiency in this manner, the first optical disc 50 and the second optical disc 60 can read information using a substantially equal amount of light. Thus the output of the light source can be reduced.

When the hologram integrated type objective lens 16 is used as the optical head which performs only read of the second optical disc 60 and can perform write and read of the first optical disc 50, it is desired that the diffraction efficiency of the plus-first-order diffraction light be 30% or below. By setting the diffraction efficiency in this manner, the transmittance (the diffraction efficiency of the zero-order diffraction light) of the hologram integrated type objective lens 16 can be increased. Thus the light utilization efficiency with respect to the first optical disc 50 for write can be high. So, the output of the light source at write can be reduced.

Figure 13A:
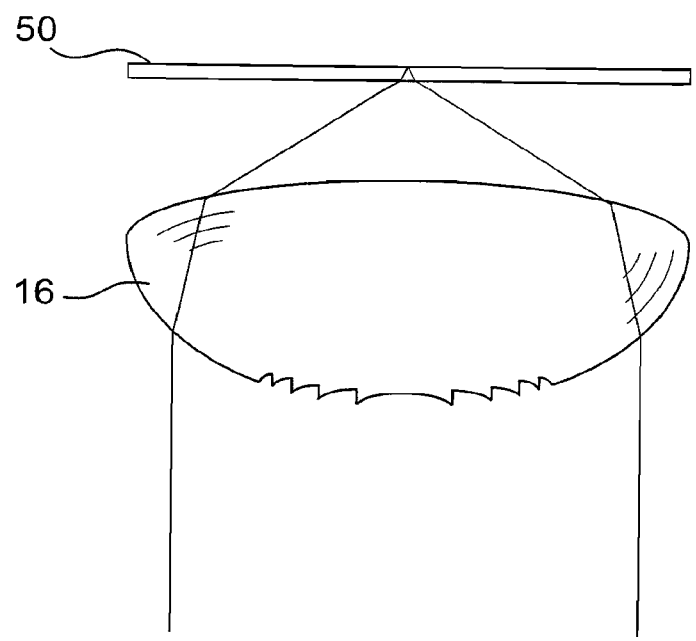
FIGS. 13A and 13B are diagrams showing the function of the hologram integrated type objective lens according to Embodiment 2 of the present invention.

The hologram integrated type objective lens 16 has an NA of 0.85 and is designed so as to form a focal spot onto the first optical disc 50 having a protective material thickness of 0.1 mm to diffraction limit, as shown in FIG. 13A, when the laser beam passed through the hologram integrated type objective lens 16 without being diffracted (that is, the zero-order diffraction light) is incident.

Figure 13B:
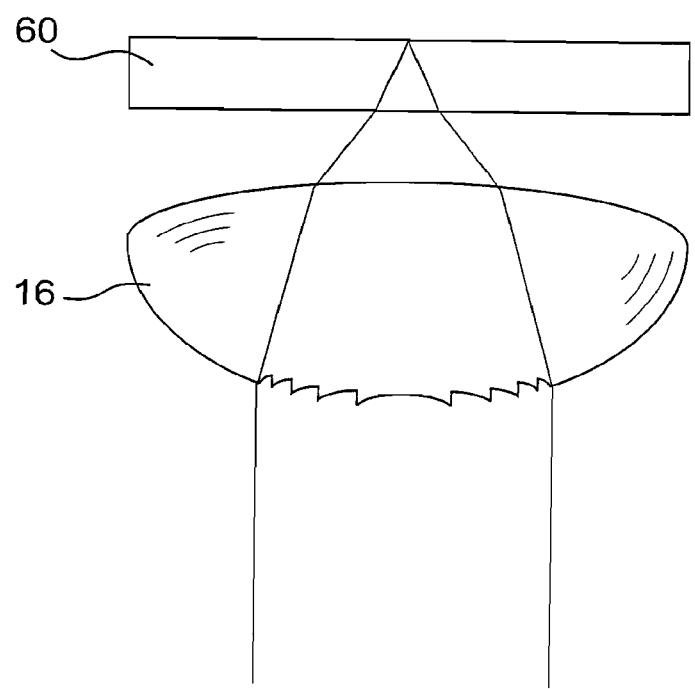

As shown in FIG. 13B, the plus-first-order diffraction light diffracted by the hologram integrated type objective lens 16 is focused onto the second optical disc 60. Here, the plus-first-order diffraction light is aberration-corrected so as to form a focal spot onto the second optical disc 60 having a protective material thickness of about 0.6 mm to diffraction limit.

The hologram integrated type objective lens 16 for diffracting part of the incident light can realize a bifocal lens which can form a focal spot focused onto each of the optical discs having different substrate thicknesses to diffraction limit.

The hologram integrated type objective lens 16 of this embodiment has the effect of adding the concave lens power to the plus-first-order diffraction light with respect to the zero-order diffraction light. Thus, the focal position of the plus-first-order diffraction light with respect to the hologram integrated type objective lens 16 is farther than that of the zero-order diffraction light. Accordingly, when the plus-first-order diffraction light is focused onto the information recording surface of the second optical disc 60 having a protective material thickness larger than that of the first optical disc 50, a working distance (WD) as the interval between the second optical disc 60 and the hologram integrated type objective lens 16 can be sufficiently secured.

The hologram integrated type objective lens 16 provides the concave lens action to the plus-first-order diffraction light. So, the positions in the optical axis direction of two focal points of the zero-order diffraction light for write or read of the first optical disc 50 and the plus-first-order diffraction light for write or read of the second optical disc 60 are different. Thus when information is written or read using a light spot formed on one of the focal points, a light spot focused on the other focal point is enlarged, which does not affect write or read of information.

When the grating pattern is formed so as to generate the desired plus-first-order diffraction light by the hologram integrated type objective lens 16, in addition to the zero-order diffraction light and the plus-first-order diffraction light, the minus-first-order diffraction light conjugating with the plus-first-order diffraction light and a higher order diffraction light are generated. As in Embodiment 1, the relation between the plus-first-order diffraction light and the zero-order diffraction light need to be appropriately set in such a manner that the stray light due to the unnecessary diffraction light does not form a small light spot on the light receiving device 9. As in Embodiment 1, the hologram lens 5 and the objective lens 6 are designed so as to appropriately set the WD1 and WD2 for the first optical disc 50 and the second optical disc 60.

As shown in Embodiment 1, the design protective material thickness of the first optical disc is t1, the design protective material thickness of the second optical disc is t2, the working distance of the first optical disc is WD1, the working distance of the second optical disc is WD2, the refractivity of the protective material is n, the first protective material thickness of the first optical disc is t1_L1, and the second protective material thickness of the first optical disc is t1_L2.

In the above condition, the conditions in which the signal light B and the stray light (5) or the stray light (6) shown in FIG. 5 are overlapped with each other on the light receiving device 9 are as follows:

from $$(t2/n+(WD2))-(t1/n+(WD1))-k=2\times t1\_L1/n \qquad \text{(Equation 8)}$$

$$(t2/n+(WD2))-(t1/n+(WD1))-k=2\times t1\_L2/n \qquad \text{(Equation 9)}$$

then $$WD1-WD2=(t2-t1-(2\times t1\_L1))/n-k \qquad \text{(Equation 10)}$$

and $$WD1-WD2=(t2-t1-(2\times t1\_L2))/n-k \qquad \text{(Equation 11)}$$

Here, the design protective material thickness of the first optical disc is t1=0.0875 mm, the first protective material thickness of the first optical disc is t1_L1=0.1±0.005 mm (the first layer), the second protective material thickness of the first optical disc is t1_L2=0.075±0.005 mm (the second layer), the design protective material thickness of the second optical disc is t2=0.6 mm, the refractivity of the protective material is n=1.6164, the focal position interval difference between the plus-first-order diffraction light and the minus-first-order diffraction light is k=0.03 mm.

In the above condition, the condition in which the signal light B and the stray light (5) or the stray light (6) are overlapped with each other on the light receiving device is:

$$WD1-WD2=0.163\pm0.007 \text{ mm}$$

or $$WD1-WD2=0.194\pm0.007 \text{ mm}$$

When the working distance WD1 of the first optical disc is 0.5 mm, the working distance WD2 of the second optical disc should not be set to near 0.337 mm and 0.306 mm.

Desirably, $$WD1-WD2\neq(t2-t1-(2\times t1\_L1))/n-k \quad \text{(Equation 12)}$$

$$WD1-WD2\neq(t2-t1-(2\times t1\_L2))/n-k \quad \text{(Equation 13)}$$

Further, desirably, $$WD1-WD2<(t2-t1-(2\times t1\_L1))/n-k-X \quad \text{(Equation 14)}$$

When X=0.01 mm, it is desired that WD1−WD2<0.147 mm. The X is the amount of margin described in Embodiment 1.

For example, when the working distance of the first optical disc 50 is set to 0.5 mm, the working distance WD2 of the second optical disc 60 is desirably larger than 0.353 mm.

By setting those conditions as described above, the S-shaped signal A1, the S-shaped signal A2, and other S-shaped signals (B1 to B3 and C1 to C3) in FIG. 7 are completely separated from each other. The influence of the stray light with respect to the S-shaped signal A1 and the S-shaped signal A2 can be substantially and sufficiently reduced.

At read of the second optical disc 60, when the protective material thickness of the second optical disc is t2_ra, the condition in which the signal light H and the stray light (7) shown in FIG. 5 are overlapped with each other on the light receiving device is as follows:

from $$\{(t2/n+WD2)-(t1/n+WD1)\}\times 2-k=t2\_ra/n \quad \text{(Equation 18)}$$

then $$WD1-WD2=(2\times t2-2\times t1-t2\_ra)/(2\times n)-k \quad \text{(Equation 20)}$$

Here, the design protective material thickness of the first optical disc is t1=0.0875 mm, the design protective material thickness of the second optical disc is t2=0.6 mm, the protective material thickness of the second optical disc is 0.57 mm≦t2_ra≦0.63 mm, the refractivity of the protective material is n=1.6164, and the focal position interval difference between the plus-first-diffraction light and the minus-first-order diffraction light is k=0.03 mm. In the above condition, the condition in which the signal light H and the stray light (7) are overlapped with each other on the light receiving device is:

$$0.092 \text{ mm} \leq WD1-WD2 \leq 0.111 \text{ mm}$$

So, when the working distance WD1 of the first optical disc 50 is 0.5 mm, the working distance WD2 of the second optical disc 60 should not be set to 0.389 mm≦WD2≦0.408 mm.

Desirably, $$WD1-WD2\neq(2\times t2-2\times t1-t2\_ra)/(2\times n)-k \quad \text{(Equation 22)}$$

Further, desirably, $$WD1-WD2>(2\times t2-2\times t1-t2\_ra)/(2\times n)-k+X' \quad \text{(Equation 24)}$$

For example, when X'=0.01 mm, it is desired that WD1−WD2>0.121 mm. The X' is the amount of margin described in Embodiment 1.

For example, when the working distance WD1 of the first optical disc 50 is 0.5 mm, it is desired that the working distance WD2 of the second optical disc 60 be smaller than 0.379 mm.

By setting those conditions as described above, the S-shaped signal D1 and other S-shaped signals (D2 to H2) are completely separated from each other. Thus the influence of the stray light with respect to the S-shaped signal D1 can be substantially and sufficiently reduced.

In Embodiments 1 and 2, the condition in which the signal light and the stray light are not overlapped with each other on the light receiving device 9 is explained in detail in the case where, in the first optical disc 50, each of the information recording surface indicated by the first protective material thickness t1_L1 and the information recording surface indicated by the second protective material thickness t1_L2 has an error of a predetermined protective material thickness, and in the second optical disc 60, the information recording surface indicated by the protective material thickness t2_ra has an error of a predetermined protective material thickness, not depending on the number of information recording surfaces.

However, the present invention is not limited to such Embodiments and is applicable to the case that the first optical disc 50 has three or more information recording surfaces and each of them has an error of a predetermined protective material thickness and that the second optical disc 60 has an error of a predetermined protective material thickness for each information recording surface.

Namely, the idea of the present invention is that with respect to the range in which the protective material thickness of the optical disc can be obtained, the signal light reflected on the information recording surface and the stray light reflected on the surface of the optical disc close to the objective lens are not overlapped with each other on the light receiving device 9. Needless to say, the present invention is widely applicable to the optical head having the diffraction device for generating diffraction lights of a plurality of orders.

In Embodiments 1 and 2, the zero-order diffraction light is used for write or read of the first optical disc 50 and the plus-first-order diffraction light is used for write or read of the second optical disc 60. However, the present invention is applicable when the plus-first-order diffraction light is used for write or read of the first optical disc 50 and the zero-order diffraction light is used for write or read of the second optical disc 60. In this case, as the plus-first-order diffraction light for write or read of the first optical disc 50 has the convex lens power, it has the merit of canceling chromatic aberration caused by the objective lens.

The hologram device and the hologram integrated type objective lens in this case form a first grating pattern only in the portion having a diameter smaller than the aperture for the first optical disc and a second grating pattern outside of it. Here, it is desired that the hologram device and the hologram integrated type objective lens be designed in such a manner that the diffraction efficiency (transmittance) of the zero-order diffraction light in the first grating pattern is less than 100%, the plus-first-order diffraction light has sufficient intensity, and the diffraction efficiency of the plus-first-order diffraction light in the second grating pattern is maximum.

When the plus-first-order diffraction light is used for write or read of the first optical disc 50 and the zero-order diffraction light is used for write or read of the second optical disc 60, the stray light due to a plus-second-order or higher order diffraction light and a minus-second-order or higher order diffraction light (e.g., advancing path: plus-first-order diffraction light by diffraction→returning path: plus-second-order diffraction light by diffraction) need to be considered.

The present invention is applicable to the optical head compatible with plural kinds of optical discs using a combination of the zero-order diffraction light and the plus-second-order diffraction light, the plus-first-order diffraction light and the plus-second-order diffraction light, or higher order diffraction lights. It is possible to realize the configuration of the optical head in such a manner that the stray light due to the necessary diffraction light does not form a small light spot on the light receiving device 9.

It is apparent that the influence of the stray light due to the necessary diffraction light is increased when the ratio of the reflectivity of the optical disc surface to the information recording surface of the optical disc is large. It is effective for the information recording medium satisfying:

$$0.5 \leq Rr/Rs \leq 3.0 \quad \text{(Equation 25)}$$

where a reflectivity of the information recording surface is Rr and a surface reflectivity is Rs. Such information recording medium has two or more information recording surfaces. It is particularly effective for the optical head for write or read of such information recording medium.

In Embodiments 1 and 2, the optical head of an infinite optical system having the collimate lens, that is, the condensing lens, is described. However, the present invention is not limited to this and is apparently applicable to an optical head of a finite optical system not having the collimate lens, that is, the condensing lens. In such optical head of the finite optical system, an objective lens functions as an objective lens and a condensing lens.

In Embodiments 1 and 2, there are described in detail the condition in which the stray light (5) (advancing path: minus-first-order diffraction light by diffraction→returning path: zero-order diffraction light by transmission) or the stray light (6) (advancing path: zero-order diffraction light by transmission→returning path: minus-first-order diffraction light by diffraction), shown in FIG. 5 and reflected on the optical disc surface of the first optical disc 50, is focused onto the light receiving device 9 and the condition in which the stray light (7) (advancing path: minus-first-order diffraction light by diffraction→returning path: minus-first-order diffraction light by diffraction) reflected on the optical disc surface of the second optical disc 60 is focused onto the light receiving device 9.

The stray lights (5) to (7) are not a problem when the concave lens power of the plus-first-order diffraction light is very large or very small.

Figure 22:
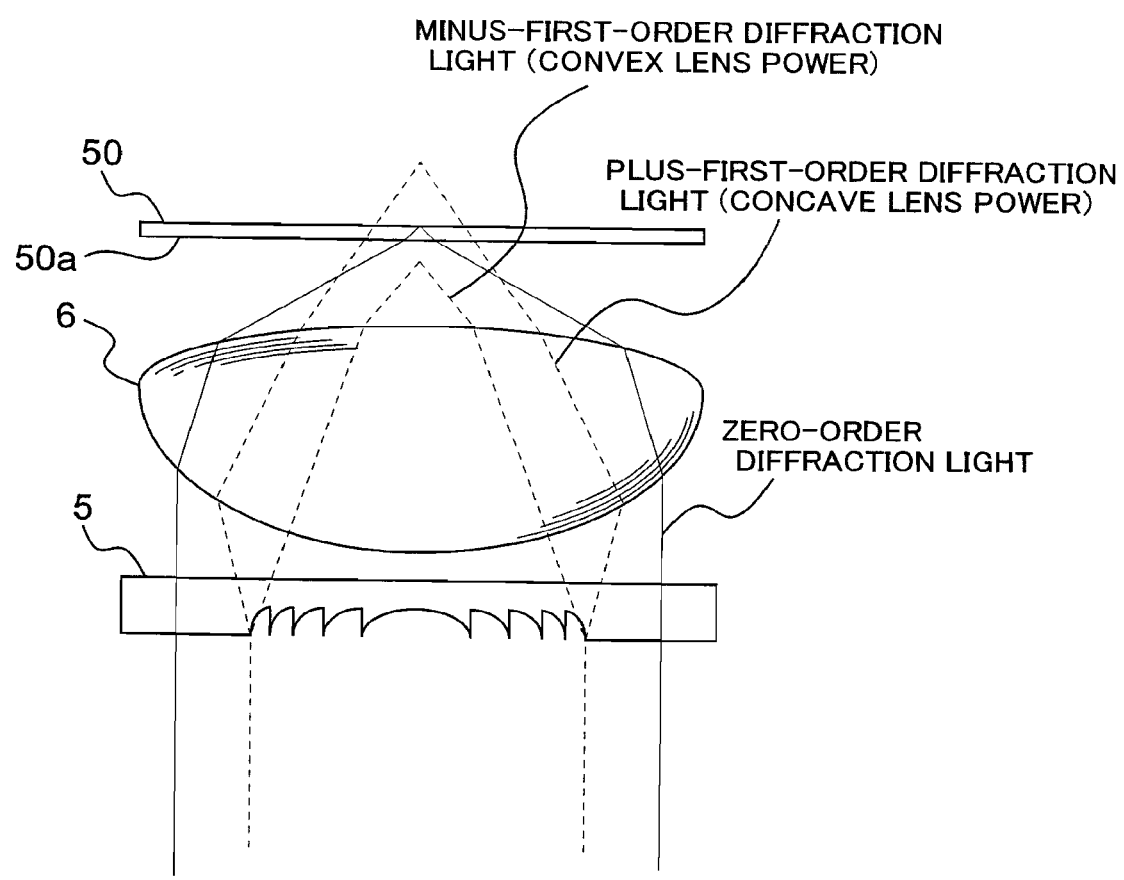
FIG. 22 is a schematic diagram of the focal positions of the plus-first-order diffraction light, the zero-order diffraction light, and the minus-first-order diffraction light shown in FIG. 6.

When the concave lens power of the plus-first-order diffraction light is large, the convex lens power of the minus-first-order diffraction light conjugating with the plus-first-order diffraction light is increased. In this case, the interval between the focal positions of the plus-first-order diffraction light, the zero-order diffraction light, and the minus-first-order diffraction light is increased. So, as shown in FIG. 22, the focal position of the minus-first-order diffraction light is moved away from the optical disc surface 50*a* and the stray lights (5), (6), and (7) are not focused onto the light receiving device 9. Namely, this is not substantially a problem.

However, to increase the concave lens power of the plus-first-order diffraction light, the pitch of the grating pattern of the hologram lens 5 need to be small. So, the difficulty of molding the hologram lens is increased and the cost becomes high. The lower limit of the grating pitch is substantially 2 μm. Thus, such hologram lens cannot be actually employed.

Figure 23:
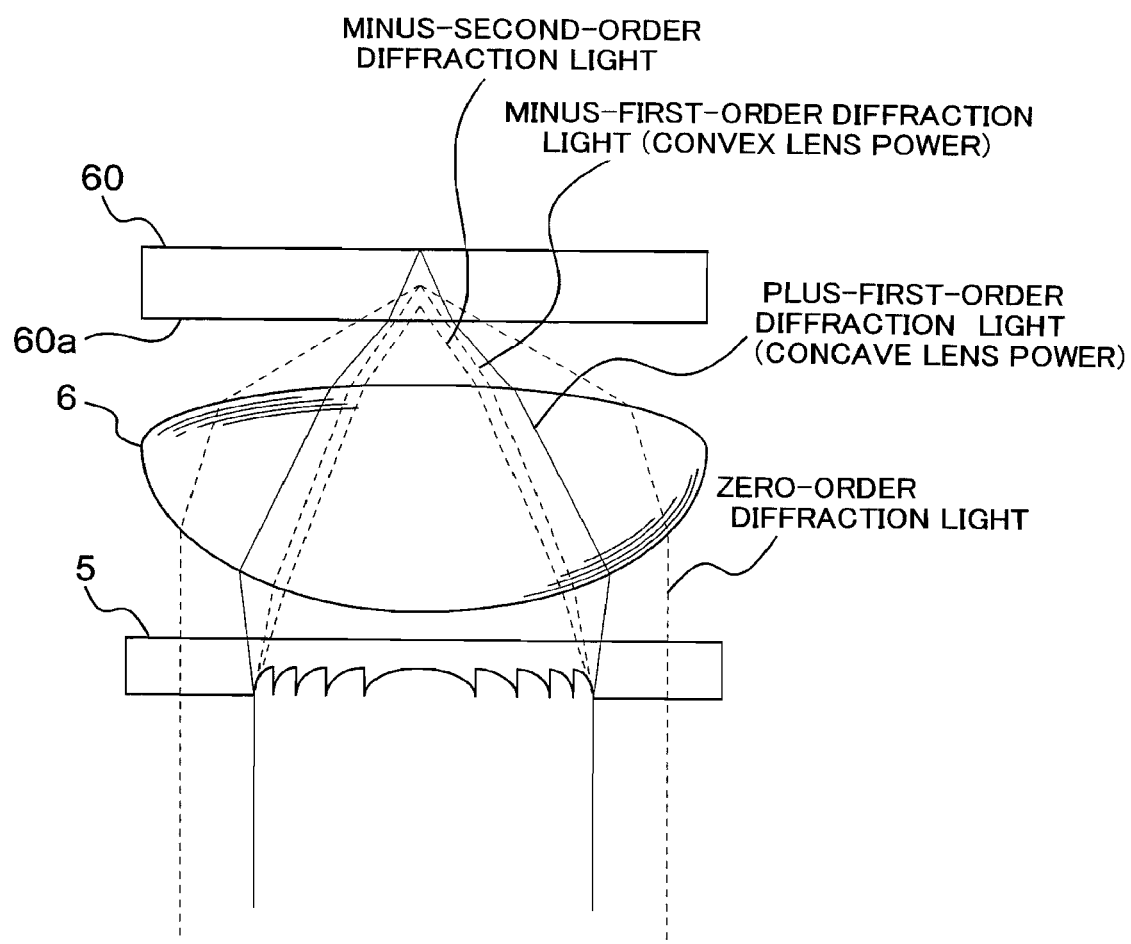
FIG. 23 is a diagram of assistance in explaining the state that the focal position of a higher order diffraction light is matched with the surface of the second optical disc shown in FIG. 8.
Figure 24:
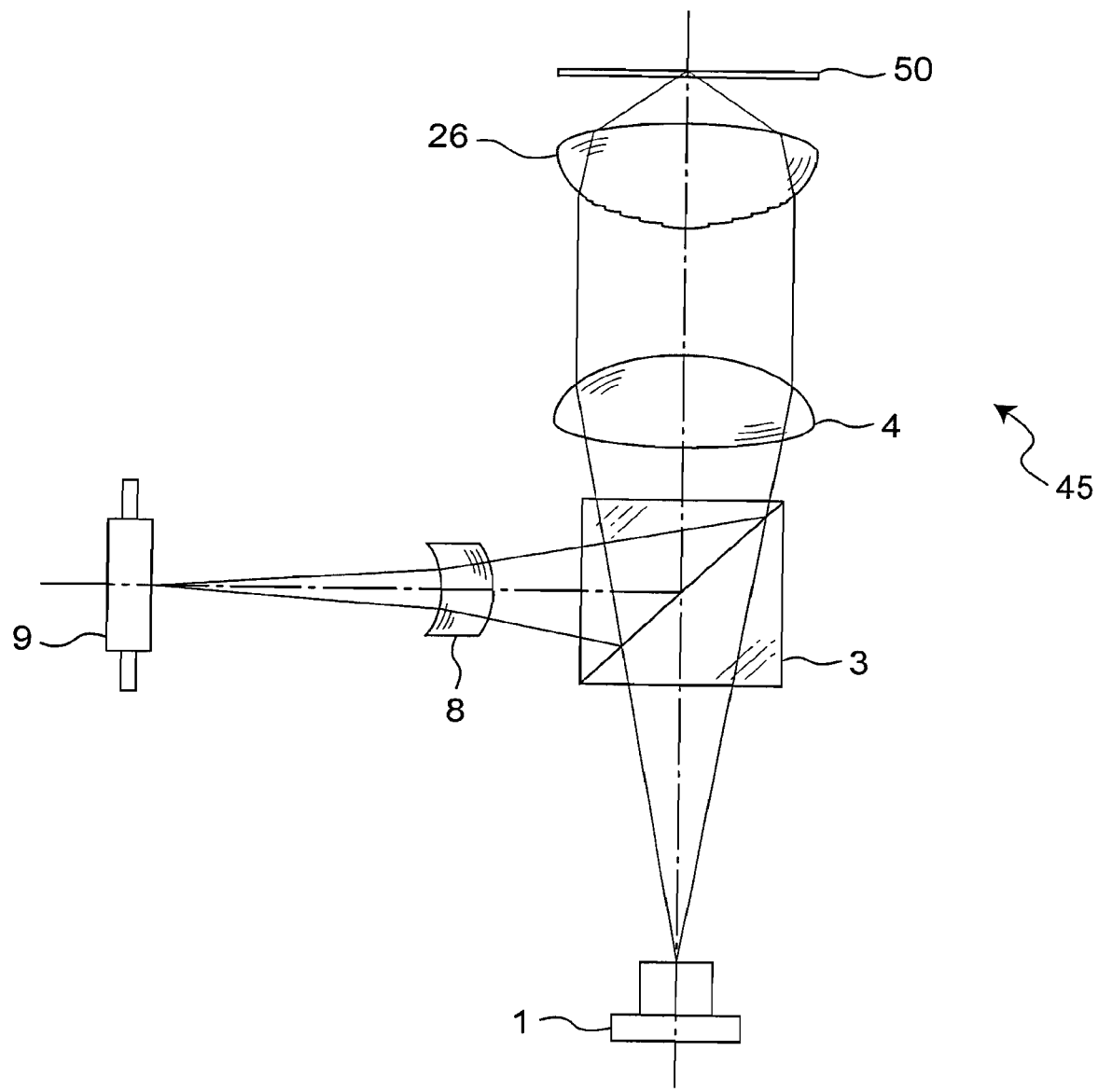
FIG. 24 is a schematic block diagram of an optical head according to Embodiment 3 of the present invention having the objective lens for diffracting laser beams having different wavelengths and focusing the laser beams onto information recording surfaces of different kinds of optical discs, in the case that the optical disc is a BD.
Figure 25:
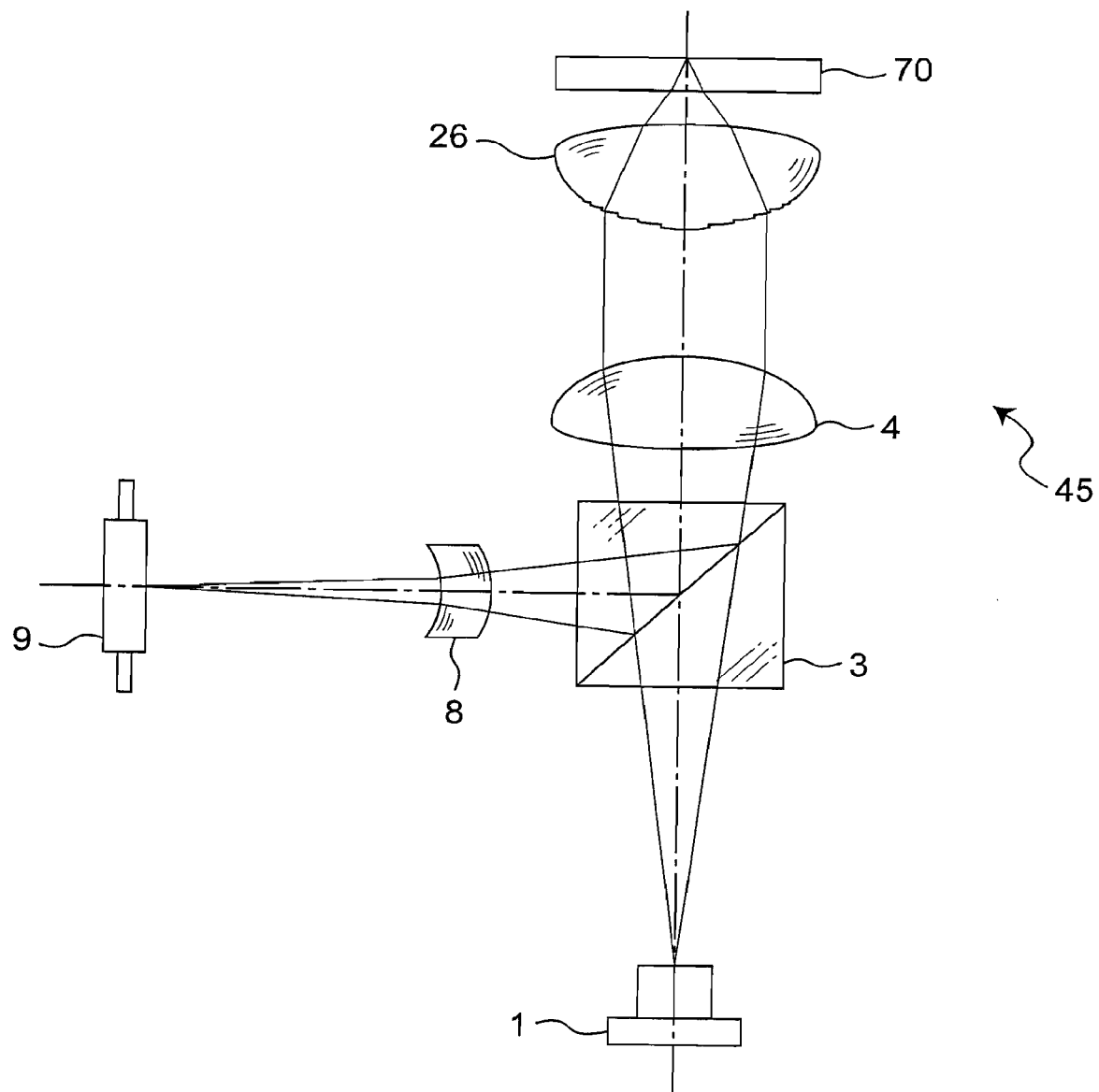
FIG. 25 is a schematic block diagram of the optical head according to Embodiment 3 of the present invention having the objective lens for diffracting laser beams having different wavelengths and focusing the laser beams onto information recording surfaces of different kinds of optical discs, in the case that the optical disc is a DVD.
Figure 26:
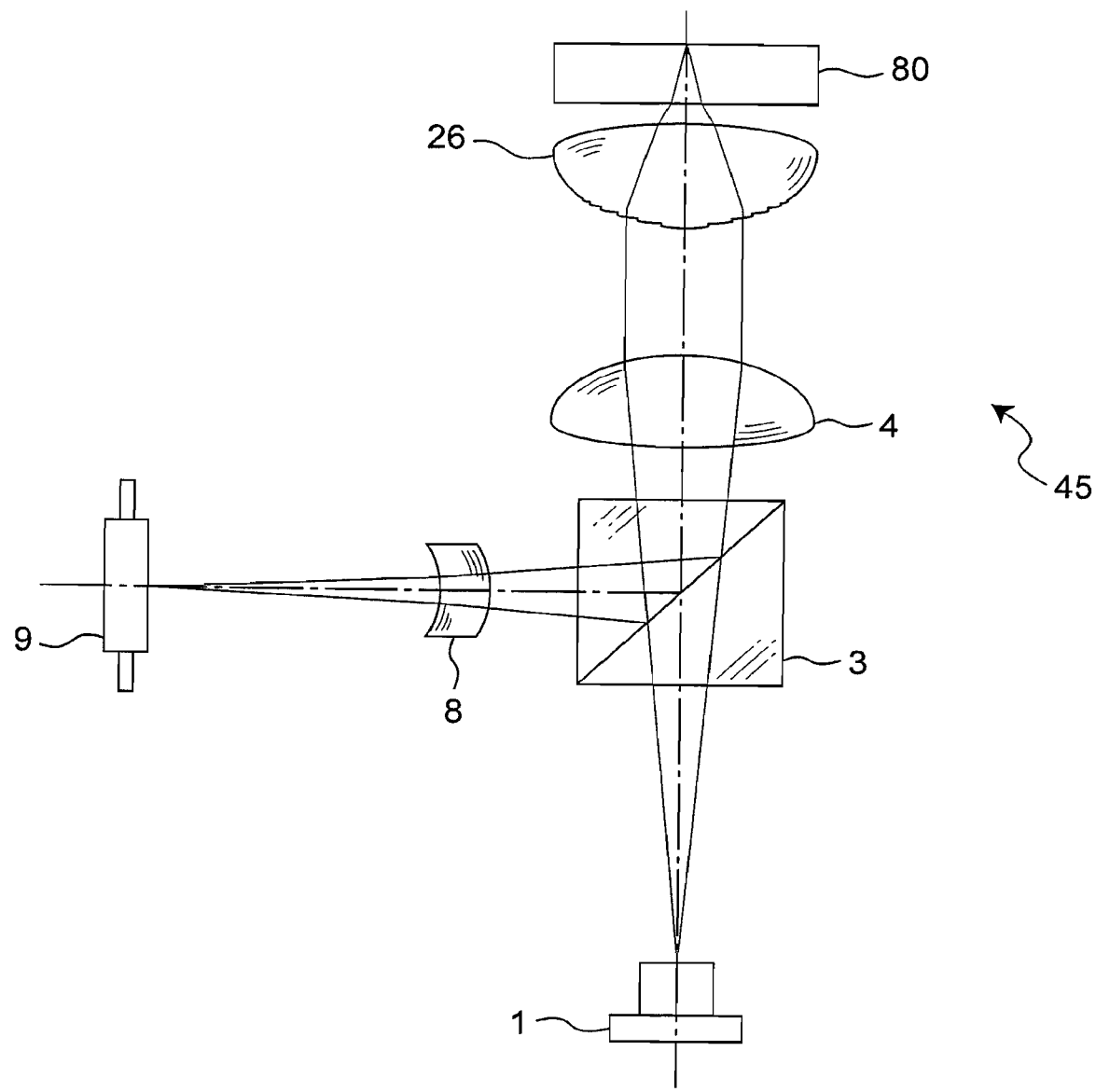
FIG. 26 is a schematic block diagram of the optical head according to Embodiment 3 of the present invention having the objective lens for diffracting laser beams having different wavelengths and focusing the laser beams onto information recording surfaces of different kinds of optical discs, in the case that the optical disc is a CD.

When the concave lens power of the plus-first-order diffraction light is small, the convex lens power of the minus-first-order diffraction light conjugating with the plus-first-order diffraction light is decreased. The interval between the focal positions of the plus-first-order diffraction light, the zero-order diffraction light, and the minus-first-order diffraction light is decreased. So, as shown in FIG. 23, the focal position of the higher order diffraction light, e.g., the minus-second-order diffraction light or a minus-third-order diffraction light is matched with the optical disc surface 60*a*. The diffraction efficiency of the higher order diffraction lights is smaller than that of the plus-first-order diffraction light, the minus-first-order diffraction light, and the zero-order diffraction light. Thus, when the stray lights reflected on the optical disc surface 60*a* are focused onto the light receiving device 9, the influence is very small.

However, it is impossible to neglect the influence of the light spot in which the zero-order diffraction light having large diffraction efficiency is reflected on the information recording surface, not on the optical disc surface, so as to be focused onto the light receiving device 9.

As described above, the present invention is not limited to the optical heads 30 and 40 described in Embodiments 1 and 2 and is widely applicable to an optical head in which a position in which a diffraction light with the n-order diffraction light in the advancing path and the n-order diffraction light in the returning path, reflected on the information recording surface of the optical disc, is focused onto the light receiving device 9 by the condensing lens is different from a position in which a diffraction light different from the n-order diffraction light in at least one of the advancing path and the returning path, reflected on the surface of the optical disc, is focused onto the light receiving device 9 by the condensing lens.

In particular, the present invention is preferably applied to an optical head for defining the lens power of the diffraction light in such a manner that the stray light (5) (advancing path: minus-first-order diffraction light by diffraction→returning path: zero-order diffraction light by transmission) or the stray light (6) (advancing path: zero-order diffraction light by transmission→returning path: minus-first-order diffraction light by diffraction), reflected on the surface of the first optical disc, is not focused onto the light receiving device or that the stray light (7) (advancing path: minus-first-order diffraction light by diffraction→returning path: minus-first-order diffraction light by diffraction) reflected on the optical disc surface of the second optical disc is not focused onto the light receiving device.

(Embodiment 3)

In Embodiments 1 and 2, there is described the optical head in which for the objective lens for focusing the n-order diffraction light and the m-order diffraction light having the same wavelength onto the information recording surfaces of different kinds of optical discs, the position in which a diffraction light with the n-order diffraction light in the advancing path and the n-order diffraction light in the returning path, reflected on the information recording surface of the optical disc, is focused onto the light receiving device by the condensing lens is different from the position in which a diffraction light different from the n-order diffraction light in at least one of the advancing path and the returning path, reflected on the surface of the optical disc, is focused onto the light receiving device by the condensing lens. The present invention is not limited to these embodiments.

The present invention is applicable to an optical head having an objective lens for diffracting laser beams having different wavelengths so as to focus the laser beams onto information recording surfaces of different kinds of optical discs.

A diffraction angle θ expressing the power of the hologram lens is determined by $$n \cdot \lambda = d \cdot \sin\theta$$

where n is a diffraction order, λ is a wavelength, and d is a grating pitch.

The d is a set value to the lens. So, when the laser beam is focused onto information recording surfaces of different kinds of optical discs, at least one of the diffraction order n and the wavelength λ may be changed.

When the optical head compatible with different kinds of optical discs is realized, use of diffraction light having the same wavelength and different order, use of diffraction lights having the same order and different wavelengths, or use of diffraction lights having different orders and different wavelengths, is a design matter. The optical head is designed in such a manner that the position in which a diffraction light having the n-order diffraction light in the advancing path and the n-order diffraction light in the returning path, reflected on the information recording surface of the predetermined information recording medium, is focused onto the light receiving device by the condensing lens is different from the position in which a diffraction light different from the n-order diffraction light in at least one of the advancing path and the returning path, reflected on the surface of the information recording surface, is focused onto the light receiving device by the condensing lens. Each case is effective and is in the range in which the present invention is applicable.

The present invention applied to such optical head will be described in detail with reference to FIGS. 24 to 27.

An objective lens 26 shown in FIGS. 24 to 27 has a diffraction structure which uses the difference between wavelengths so as to focus the plus-third-order diffraction light of the blue-violet laser beam onto the information recording surface of the BD 50 having a protective material thickness of 0.1 mm, to focus the plus-second-order diffraction light of the red laser beam onto the information recording surface of the DVD 70 having a protective material thickness of 0.6 mm, and to focus the plus-second-order diffraction light of the infrared laser beam onto the information recording surface of the CD 80 having a protective material thickness of 1.2 mm. The objective lens 26 is designed in such a manner that the diffraction efficiency of the plus-third-order diffraction light of the blue-violet laser beam is about 93%, the diffraction efficiency of the plus-second-order diffraction light of the red laser beam is about 94%, and the diffraction efficiency of the plus-second-order diffraction light of the infrared laser beam is about 52%.

The objective lens 26 has a diffraction structure in which the plus-first-diffraction light has the concave lens power in order to focus the plus-first-order diffraction light having a corresponding wavelength onto the information recording surfaces of the BD 50, the DVD 70, and the CD 80. This structure is employed in order that as the wavelength is longer, the concave lens power is increased because the red laser beam and the infrared laser beam having a long wavelength are used so as to be focused onto the information recording surfaces of the DVD 70 and the CD 80 having a large protective material thickness.

Figure 27:
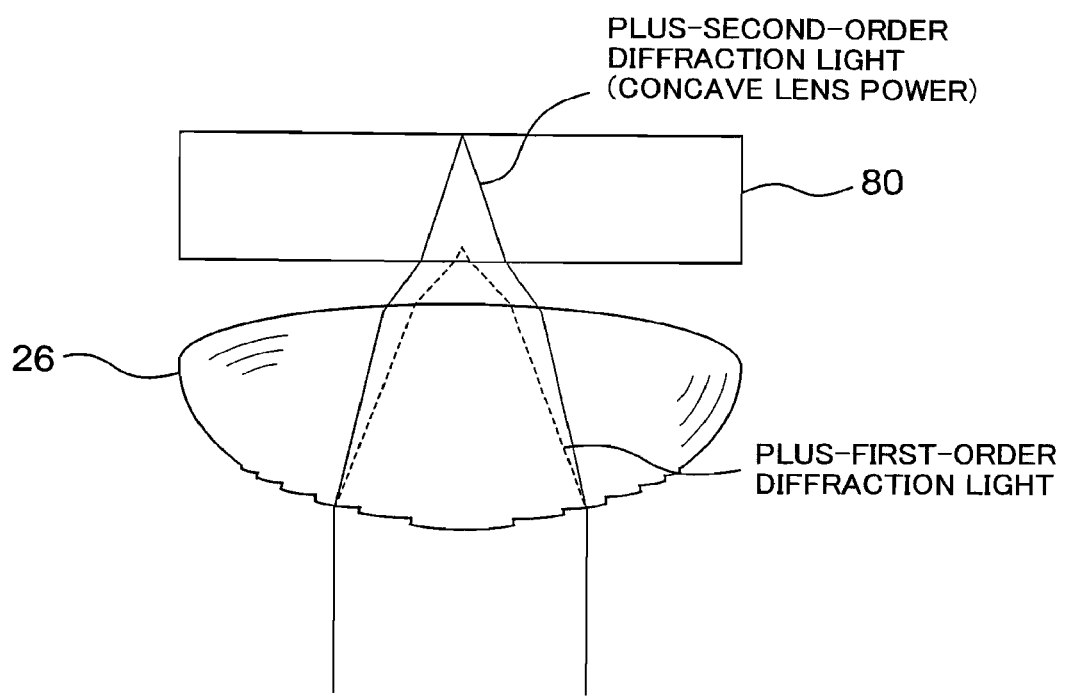
FIG. 27 is a diagram of assistance in explaining the optical head shown in FIG. 26 in which the focal position of the plus-first-order diffraction light is close to the surface of the optical disc.

As shown in FIG. 27, in the infrared laser beam, the focal position of the plus-first-order diffraction light having a concave lens power smaller than that of the plus-second-order diffraction light is in the direction close to the optical disc surface. The diffraction efficiency of the plus-first-order diffraction light is about 29%. So, the concave lens power is preferably determined in such a manner that the plus-first-order diffraction light is reflected on the surface of the CD 80 so as not to be focused onto the light receiving device 9 by the condensing lens.

(Embodiment 4)

Figure 14:
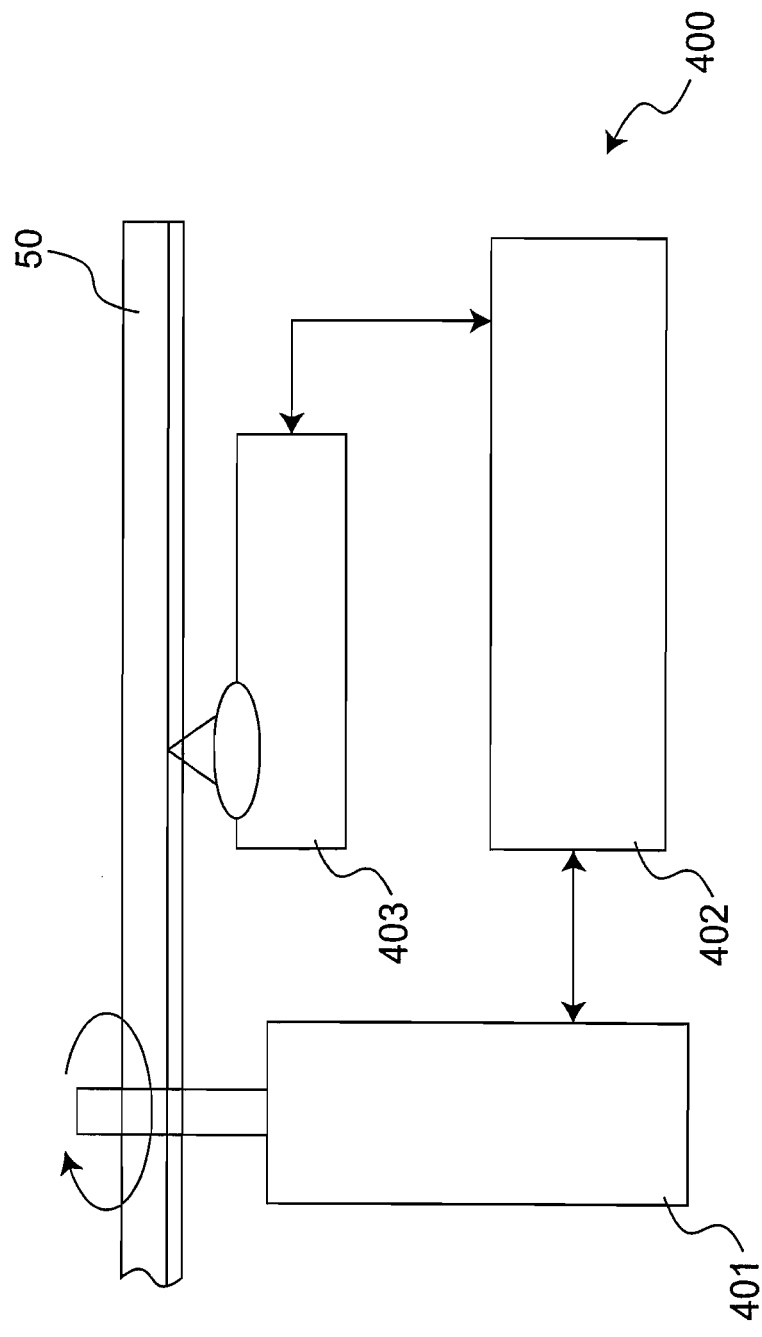
FIG. 14 is a schematic block diagram of an optical disc apparatus according to Embodiment 4 of the present invention.

FIG. 14 is a schematic block diagram of an optical disc apparatus according to an embodiment of the present invention.

In FIG. 14, the reference numeral 400 denotes the optical disc apparatus which has in its inside an optical disc driving unit 401, a control unit 402, and an optical head 403. The reference numeral 50 denotes the first optical disc which can be replaced with the second optical disc 60.

The optical disc driving unit 401 has the function of rotating and driving the first optical disc 50 or the second optical disc 60. The optical head 403 is any one of the optical heads described in Embodiments 1 to 3. The control unit 402 has the function of driving and controlling the optical disc driving unit 401 and the optical head 403, the function of performing signal processing of a control signal and an information signal light-received by the optical head 403, and the function of interfacing the information signal with the outside and inside of the optical disc apparatus 400.

The optical disc apparatus 400 is equipped with any one of the optical heads described in Embodiments 1 to 3. So, the optical disc apparatus 400 of this embodiment can satisfactorily perform write or read of a plurality of optical discs.

A focus control method preferable for the optical head 403 as any one of the optical heads described in Embodiments 1 to 3 executed by the control unit 402 in the optical disc apparatus 400 will be described below. The focus control method is not limited to the optical heads described in Embodiments 1 to 3.

To write information onto the information recording surface of the optical disc or read the information written onto the information recording surface of the optical disc, it is necessary to control the position of the objective lens in the optical axis direction so as to focus a focal spot of the laser beam passing through the objective lens onto the information recording surface. This is called focus control. The focus control can be realized by a control loop which detects the focus error signal indicating that how far a focal spot is away from the information recording surface, that is, the amount of a focal error, by the optical head and moves the objective lens in the direction reducing the focus error signal. Operating the control loop is referred to as "starting focus control". As described in Embodiment 1, an unit portion having the objective lens is driven by the actuator 31 in the focus direction 31a so as to perform the focus control.

The range in which the focus error signal is substantially proportional to the amount of a focal error is limited to the case that the focal error is in a certain fixed range. The range is called a controllable range. The amount is ±10 μm at most and can also be ±1 μm, depending on the design. It is necessary to start the focus control when the amount of a focal error becomes sufficiently small so as to be in the controllable range while the objective lens is moved by the actuator 31 in the optical axis direction. An embodiment of such focus control starting method will be described with reference to FIGS. 28 to 32. It is preferable that an integrated circuit storing such focus control starting method be used as an electric circuit used for the optical disc apparatus 400.

Figure 28:
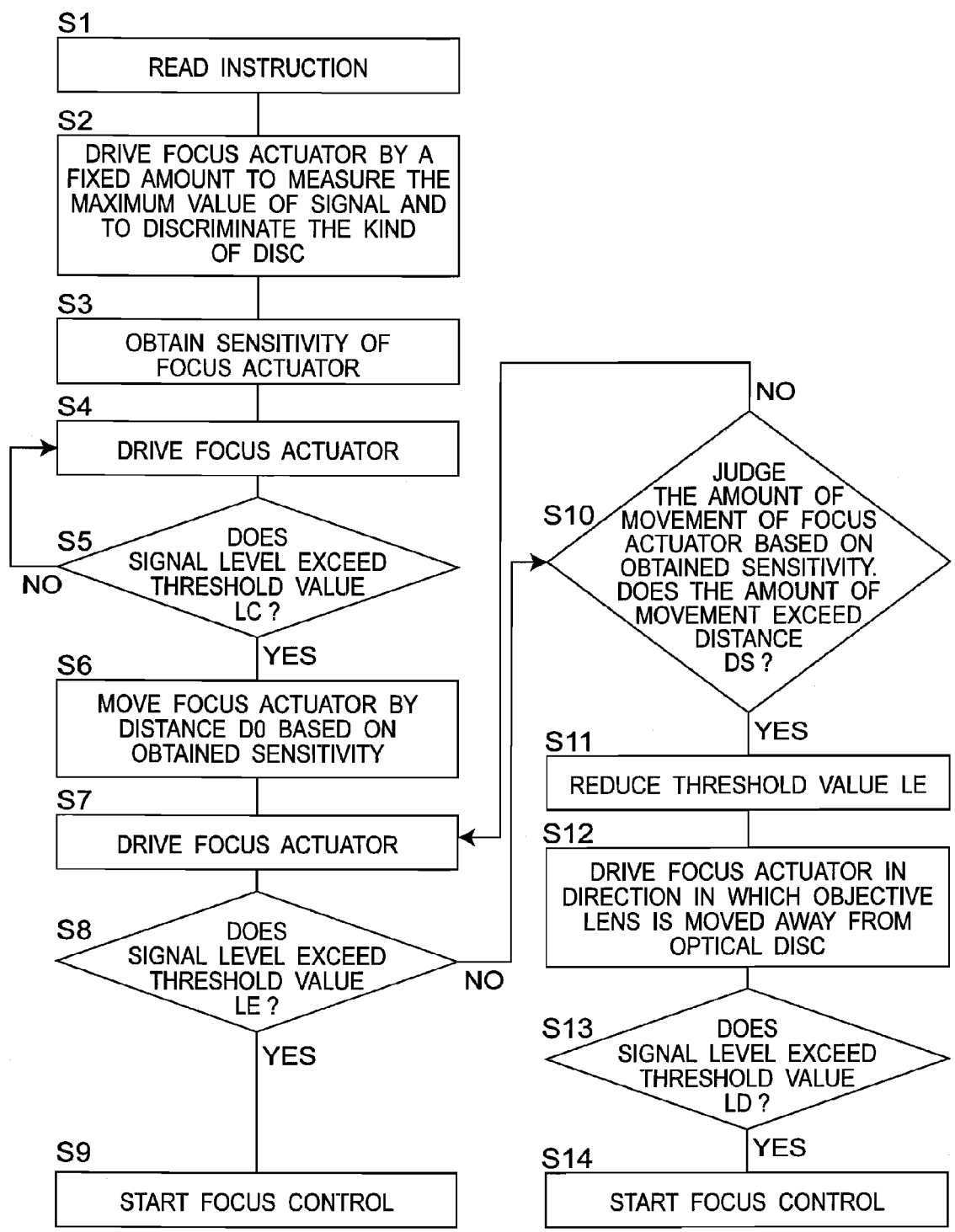
FIG. 28 is a flowchart showing a focus control operation executed by a control unit in the optical disc apparatus shown in FIG. 14.

FIG. 28 shows an example of the algorithm of the focus control starting method. For the optical head 403 in the optical disc apparatus 400, the optical head 30 described in Embodiment 1 is taken as an example.

When the optical disc apparatus 400 is turned on or the optical disc, e.g., one of the optical disc 50 and the optical disc 60 described in Embodiments 1 and 2, is inserted into the optical disc apparatus 400, a read instruction is given from the electric circuit (step S1). In step S2, the objective lens 6 is moved in the direction close to the optical disc while the light source 1 is worked. To bring the objective lens 6 close to the optical disc, a focus driving current is flowed to the actuator 31. The amount of the focus driving current is increased or decreased in a constant amount so as to move the objective lens 6 in the optical axis direction. Desirably, the sensitivity (focus sensitivity) of the actuator 31 is designed or measured at designing or manufacturing step, the amount of the focus driving current increased or decreased is determined in such a manner that the objective lens 6 is not brought into contact with the optical disc surface, and the amount of movement is stored in the memory unit in an information device such as a flash memory.

Figure 29:
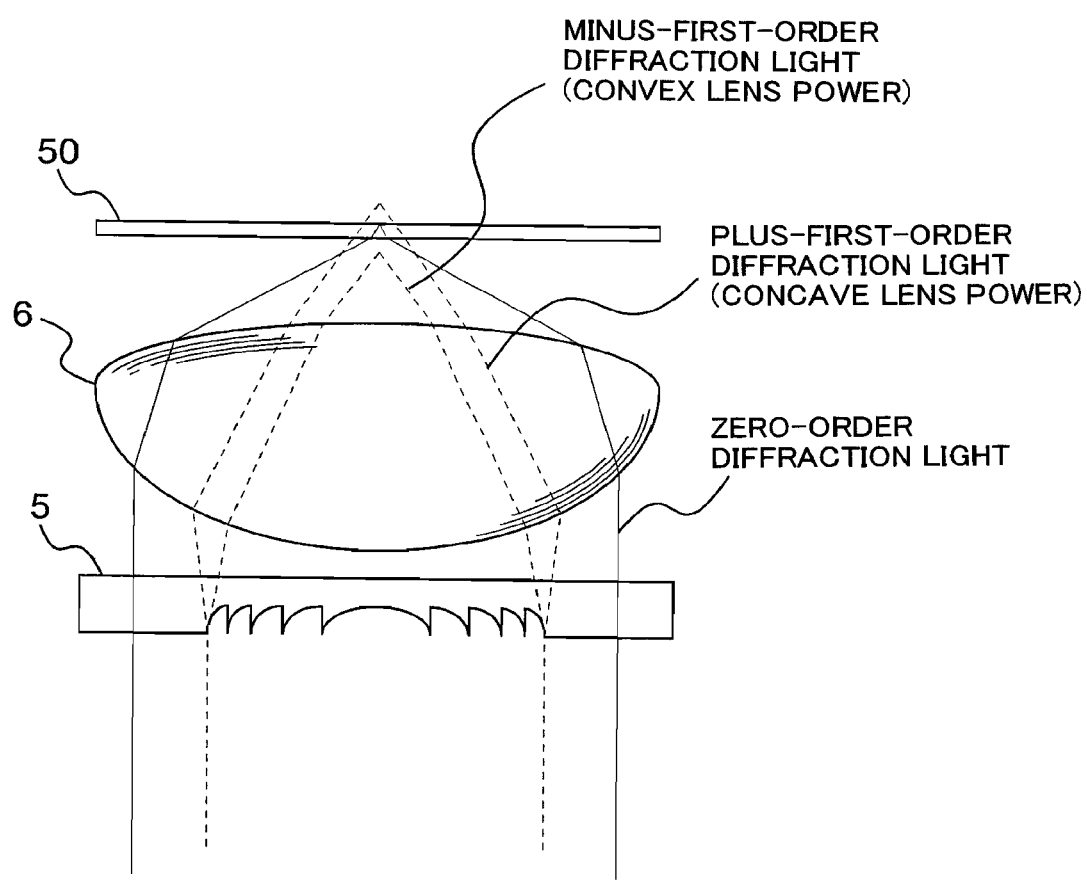
FIG. 29 is a diagram showing that when the focus control operation shown in FIG. 28 is executed to the first optical disc, the zero-order diffraction light is focused onto the information recording surface of the optical disc.
Figure 30:
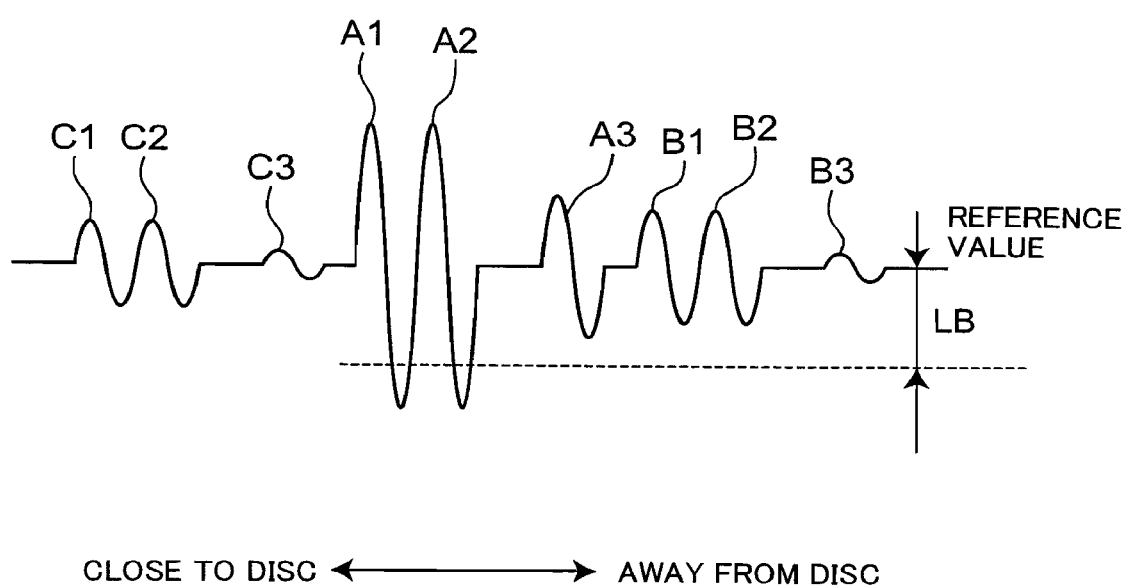
FIG. 30 is a diagram of assistance in explaining the case that the focus control operation shown in FIG. 28 is executed to the focus error signals appearing from the first optical disc.

When the objective lens 6 is brought close to the optical disc, the focus error signal is changed. When the thickness of the transparent protective material of the optical disc is small, e.g., 0.1 mm, and as shown in FIG. 29, the zero-order diffraction light is focused onto the information recording surface, the spherical aberration is equal to or lower than 70 m λ rms, that is, the Marechal criterion. In the state as designed, a focal spot can be obtained to diffraction limit. The light for forming the focal spot is reflected on the information recording surface and then passes through the hologram lens 5 again. The focus error signals formed by incidence of the zero-order diffraction light caused at this time on the light receiving device 9 are A1 and A2 shown in FIG. 30. FIG. 30 shows a two-layer optical disc having two information recording surfaces. The A2 is the focus error signal corresponding to the information recording surface present in the position in which the light passes through the transparent protective material having a thickness of about 0.1 mm from the surface of the optical disc. When the diffraction efficiency (transmission efficiency) of the zero-order diffraction light of the hologram lens 5 is about 65% and the diffraction efficiency of the plus-first-order diffraction light is about 15%, the intensity of the zero-order diffraction light is large and the aberration is minimum. Thus, the A1 and A2 form significantly large signals.

When the large focus error signal appears in the position at a distance of about 0.1 mm from the surface, the optical disc inserted into the optical disc apparatus 400 can be discriminated as the optical disc having a transparent protective material thickness of about 0.1 mm. A threshold value LB is provided, and the objective lens 6 is brought close to the optical disc from the position away from the optical disc again so as to start the focus control when the focus error signal exceeds the threshold value LB.

When the optical disc inserted into the optical disc apparatus 400 is the optical disc having a transparent protective material thickness of about 0.1 mm, the focus control can be started immediately.

The threshold value LB is the isolation amount of the focus error signal from the reference signal level and can be positive or negative. The magnitude of the threshold value is defined as an absolute value of the isolation amount of the focus error signal from the reference signal level. In step S2, the amount of light PS incident on the light receiving device 9 is monitored so as to measure the maximum value FSM. By measuring the FSM, the focus error signal is standardized by the FSM. Although the reflectivity of the information recording surface of the optical disc is often different for each of the optical discs, regardless of it, the focus error signal of the same shape can be observed.

When the large focus error signal does not appear in the position at the distance of about 0.1 mm from the optical disc surface, the optical disc can be the optical disc having a transparent protective material thickness of 0.6 mm. In such case, in step S3, as the objective lens 6 need to be brought closer to the optical disc, the operation for obtaining the sensitivity of the actuator 31 is performed. The sensitivity of the actuator 31 is an amount of movement of the objective lens 6 per unit current flowed to the actuator 31. As the amount of an electric current can be measured by a voltage generated in particular resistance, the sensitivity of the actuator 31 can also be defined as per unit voltage. In the following description, the sensitivity of the actuator 31 can also be called a focus sensitivity. For the sensitivity of the actuator 31, at manufacturing the optical head, the actuator 31 is actually moved so as to measure the amount of movement by a laser distance measuring device and the result is stored in a non-volatile memory such as a flash memory. In this step, the focus sensitivity of the actuator may be obtained from the memory.

Figure 31:
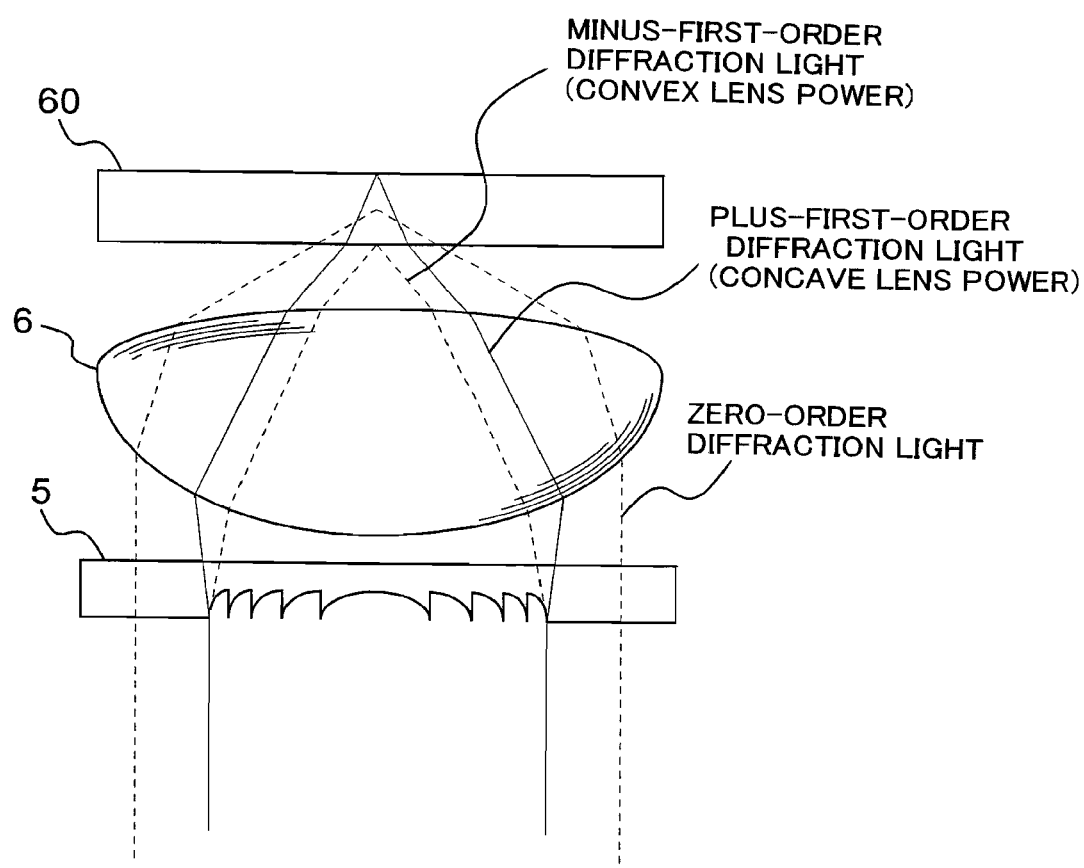
FIG. 31 is a diagram showing that when the focus control operation shown in FIG. 28 is executed to the second optical disc, the plus-first-order diffraction light is focused onto the information recording surface of the optical disc.
Figure 32:
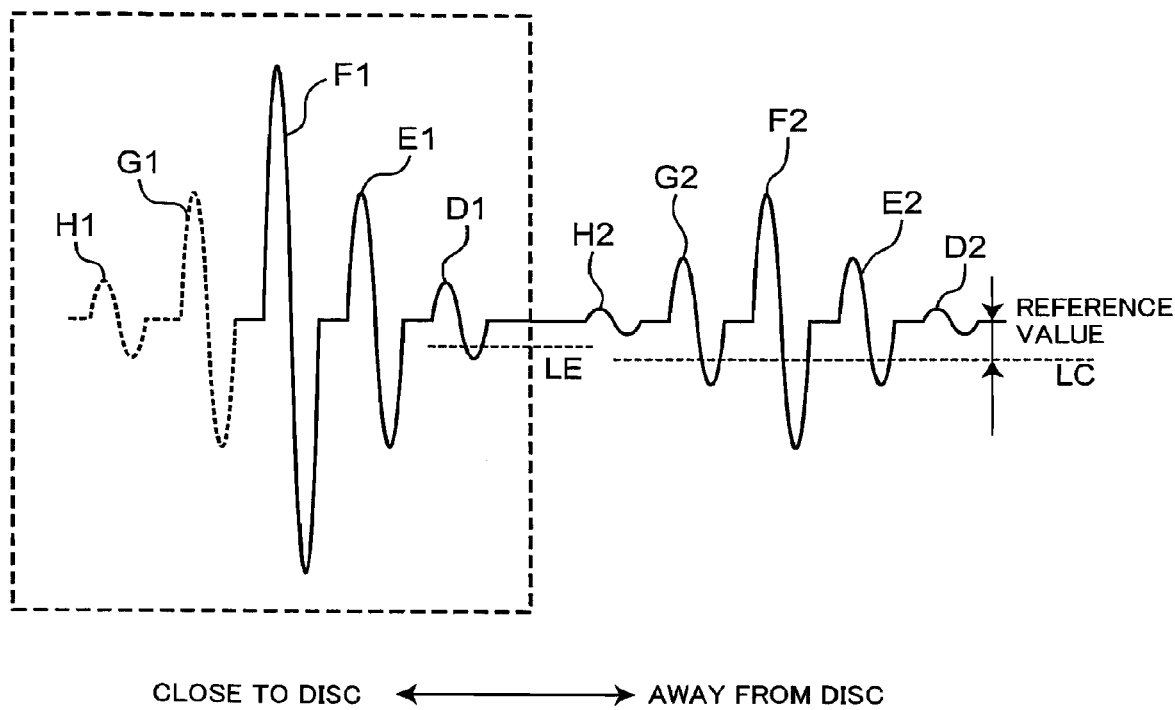
FIG. 32 is a diagram of assistance in explaining the case that the focus control operation shown in FIG. 28 is executed to the focus error signals appearing from the second optical disc.
Figure 33:
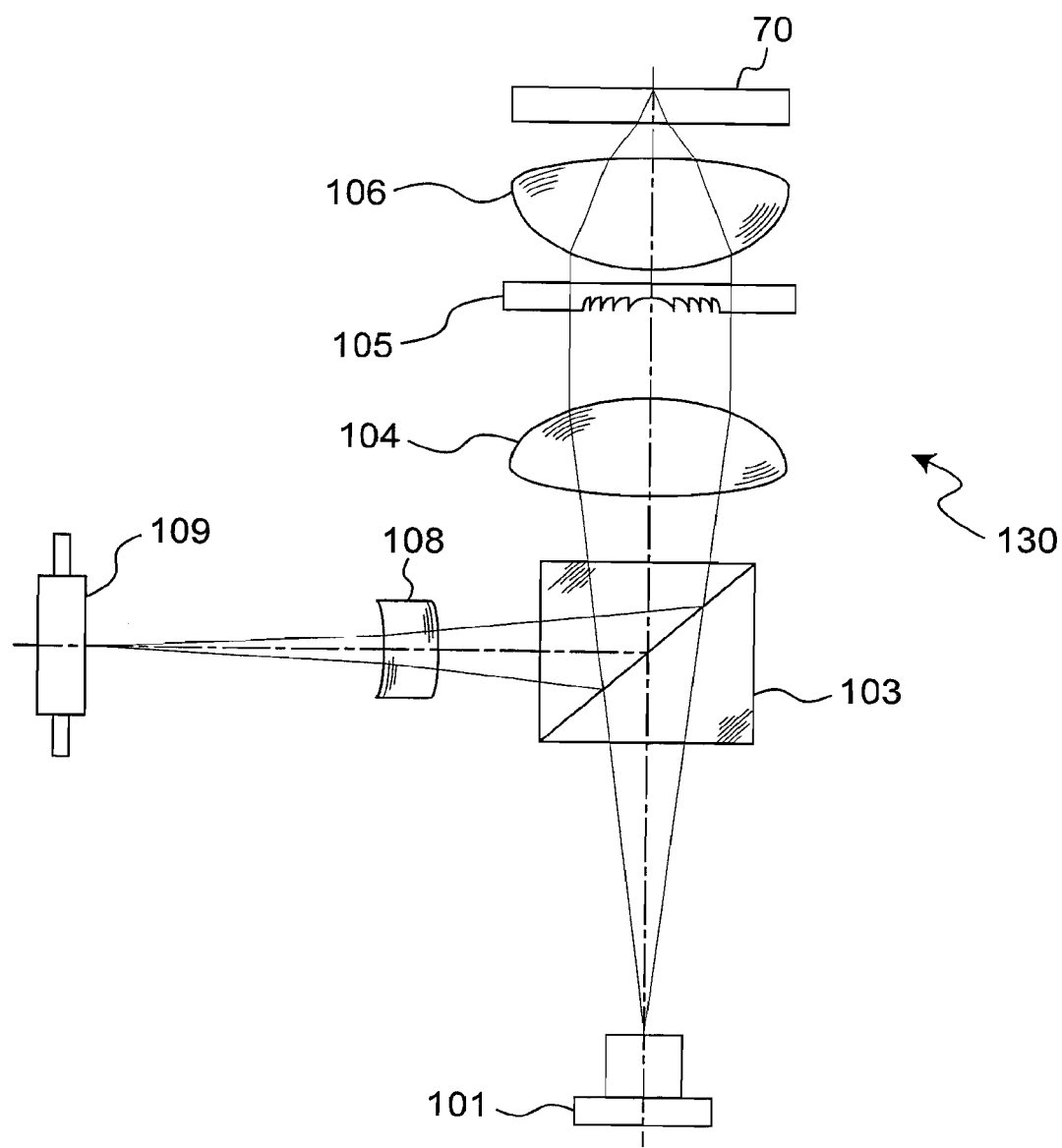
FIG. 33 is a schematic block diagram of a conventional optical head for write or read of the DVD.
Figure 34:
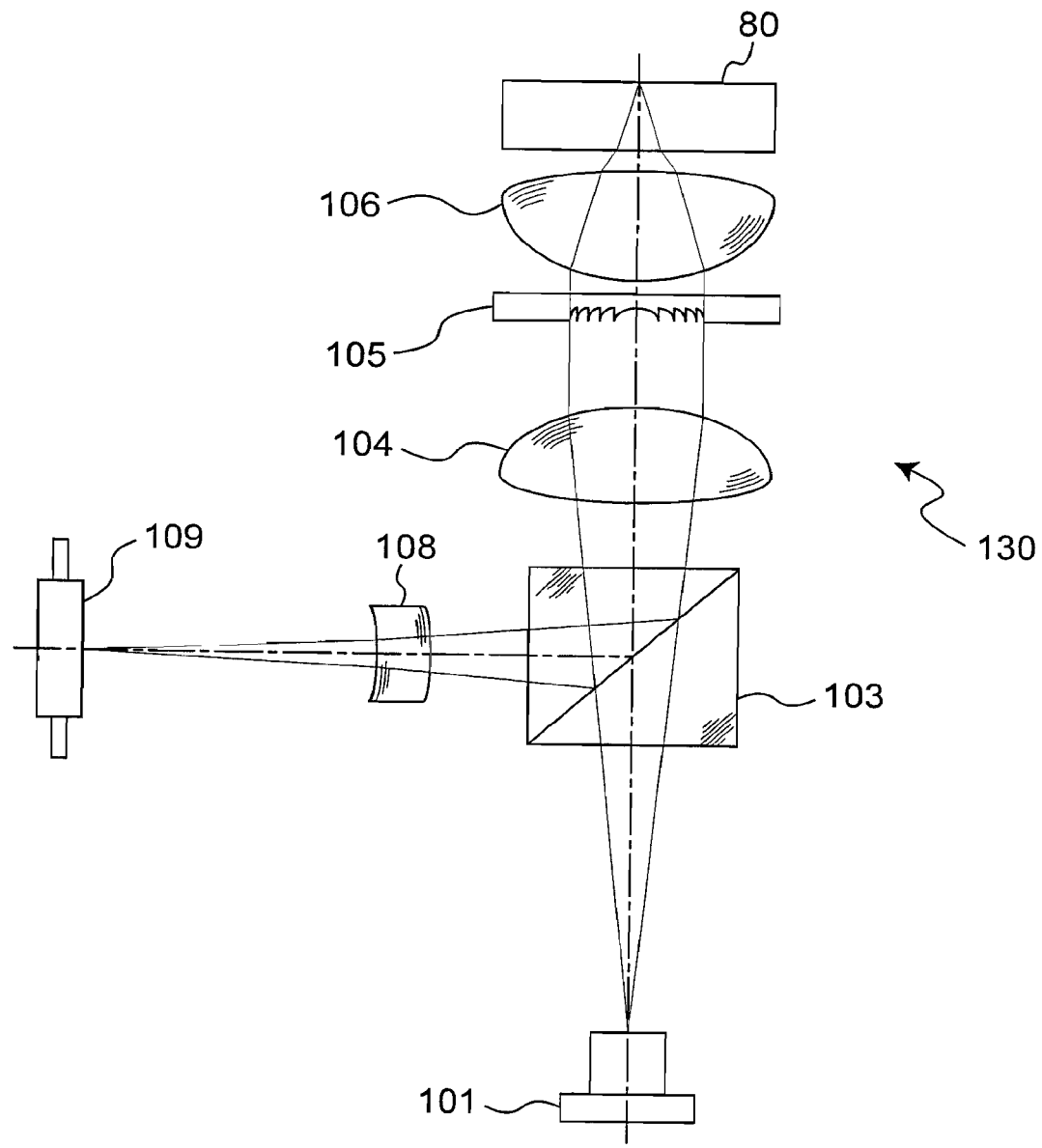
FIG. 34 is a schematic block diagram of the conventional optical head for write or read of the CD.
Figure 35:
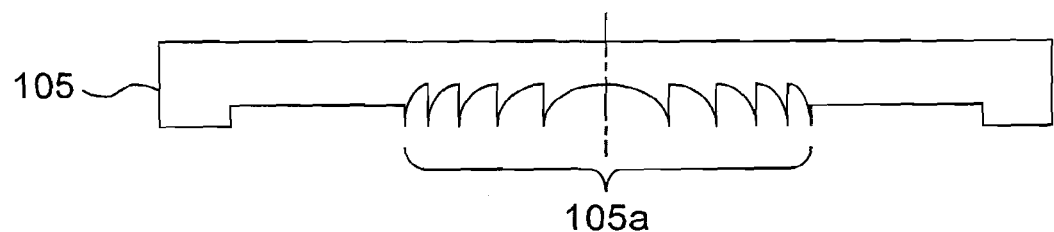
FIG. 35 is a diagram schematically showing the configuration of a hologram lens of the conventional optical head.
Figure 36A:
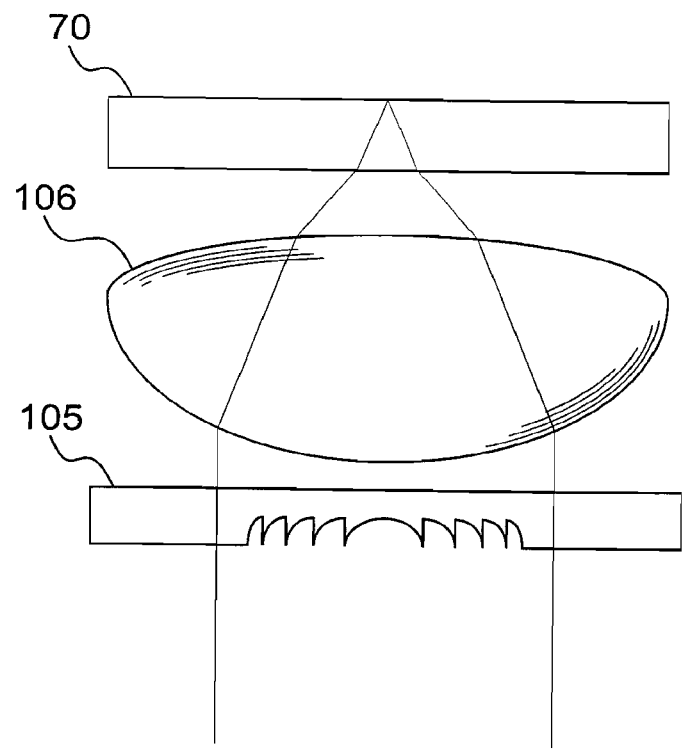
FIGS. 36A and 36B are diagrams showing the functions of the hologram lens and an objective lens of the conventional optical head.
Figure 36B:
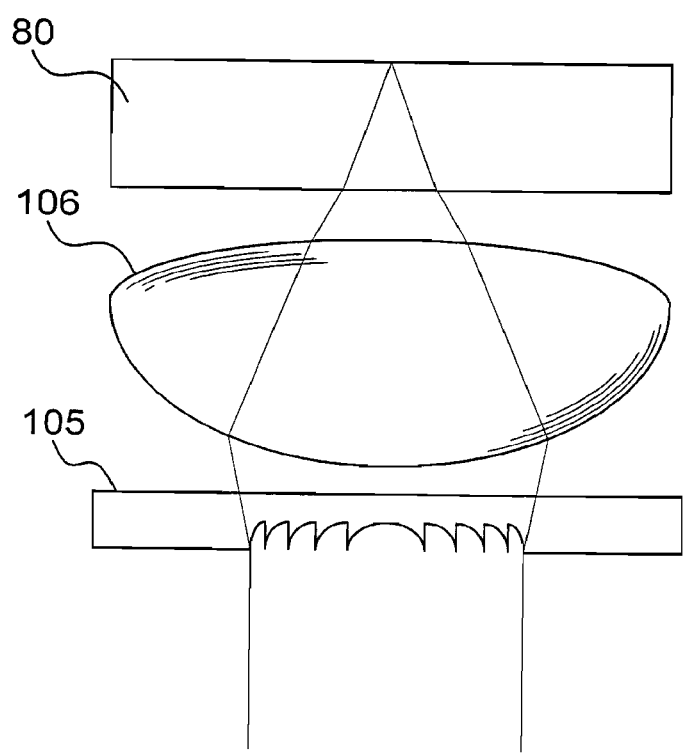

To obtain a higher accuracy focus sensitivity, the following method is effective. When the transparent protective material thickness of the optical disc is larger, e.g., 0.6 mm, and as shown in FIG. 31, when the plus-first-diffraction light of the hologram lens 5 is focused onto the information recording surface of the optical disc, the spherical aberration is equal to or lower than 70 m λ rms, that is, the Marechal criterion. In the state as designed, a focal spot can be obtained to diffraction limit. The light for forming the focal spot is reflected on the information recording surface and then passes through the hologram lens 5 again. The focus error signal formed by incidence of the plus-first-order diffraction light generated at this time on the light receiving device 9 is D1 shown in FIG. 32. FIG. 32 shows a single-layer optical disc having one information recording surface.

A threshold value LC is provided and the objective lens 6 is brought close to the optical disc from the position away from the optical disc again so as to monitor the amount of the actuator driving current or the difference between the voltages from the first point at which the focus error signal exceeds the threshold value LC to the next point at which the focus error signal exceeds the threshold value LC. The first point at which the focus error signal exceeds the threshold value LC is the signal E2. This is a signal which overlaps the signals obtained in such a manner that a laser beam having the zero-order laser beam and the plus-first-order laser beam and a laser beam having the plus-first-order laser beam and the zero-order laser beam in the advancing path and the returning path in the hologram lens 5 are combined and incident on the light receiving device 9. The next point at which the focus error signal exceeds the threshold value LC is the signal F2. This is a signal obtained in such a manner that the zero-order laser beam in the advancing path and the zero-order laser beam in the returning path is incident on the light receiving device 9. A further point at which the focus error signal exceeds the threshold value LC is the signal G2. This is a signal which overlaps the signals obtained in such a manner that a laser beam having the zero-order laser beam and the minus-first-order laser beam and a laser beam having the minus-first-order laser beam and the zero-order laser beam in the advancing path and the returning path are combined and incident on the light receiving device 9. The interval between the signals is determined by the design of the hologram lens 5, not depending on the different protective material thicknesses of various optical discs.

Using such characteristic, the amount of movement d of the objective lens 6 can be accurately measured, not depending on the change in ambient temperature of the optical head 30.

The signals E2 and F2 obtained by a light whose diffraction order of the hologram lens 5 is different by one order of magnitude only in one of the advancing path and the returning path. Thus, the d is half of the distance between plural focal points which can be actually formed on the optical disc side by different orders. When such distance d is divided by the amount of the actuator driving current or voltage changed therebetween, the focus sensitivity can be determined. To measure the focus sensitivity, the optical disc may be rotated. However, to avoid an error due to the surface deflection of the optical disc, the optical disc is desirably stopped without being rotated.

After the focus sensitivity is determined in step S3 as described above, in step S4, the objective lens 6 is moved away from the optical disc once. While the optical disc is rotated, the objective lens 6 is brought close to the optical disc again. When, in step S5, the signal level obtained from the light receiving device 9 exceeds the LC, the routine is moved to step S6.

In step S6, the objective lens 6 is brought close to the optical disc by a fixed amount D0. The distance D0 is in the range in which the focus control range is not present. The distance D0 can be determined from the obtained distance d. The protective material thickness of the optical disc is T and its refractivity is n. When the wavelength is 405 nm and the material of the protective material of the optical disc is polycarbonate, n is about 1.6. The distance from the point at which the signal G2 is detected is calculated to $D0=T/n-(3d)$. However, as the distance D0 is provided so as not to start the focus control by mistake to the signal H2 appearing following by the signal G2, the distance D0 may be from the point at which the signal F2 is detected. In this case, the distance D0 may be $D0>2d$. As described above, D0 may be in the following range:

$$2d<D0<T/n-(3d)$$

When the focus control is performed to the signal H2 by mistake, the focus control can be stopped once so that the objective lens 6 is brought close to the optical disc side. Thus, step S6 can be omitted.

Based on the focus sensitivity k determined in step S3, in steps S7 to S10, the upper limit of the amount of movement of the objective lens 6 for searching for the signal D1 performing the focus control is determined. A distance DS searched for from the position at which the signal E2 is detected is $DS>T/n-(d)$. Here, T, n, and d are as described above. The distance DS from the position at which the signal G2 is detected is $DS>T/n-(3d)$ at the minimum. Due to the error factor such as the surface deflection of the optical disc, the actual distance DS need to be set to be slightly larger than the calculated value. When the interval between the surface of the objective lens 6 and the optical disc surface at read of the optical disc having the protective material thickness T is the working distance WD and the distance set to be slightly larger is set to be less than the WD, contact of the optical disc and the objective lens 6 can be prevented. The distance DS is $DS<T/n-(d)+WD$ at the maximum. Actually, contact of the optical disc and the objective lens 6 due to the error factor such as the surface deflection of the optical disc need to be reliably prevented. So, the amount set to be slightly larger is desirably about one third of the WD.

Desirably, $$DS<T/n-(3d)+WD/3$$

The distance DS of the upper limit of the amount of movement of the objective lens 6 moved by searching for the signal D1 performing the focus control is:

$$T/n-(3d)<DS<T/n-d+WD$$

In a narrower range, $$T/n-d<DS<T/n-(3d)+WD/3$$

In steps S7 to S10, the objective lens 6 is brought close to the disc (S7) so as to monitor a signal level obtained from the light receiving device 9, and when the signal level exceeds the threshold value LE (S8), the focus control is started (S9). When the signal level does not reach the threshold value LE in step S8, the amount of movement of the objective lens 6 from the point at which the signal level obtained from the light receiving device 9 exceeds the threshold value LC is compared with the distance DS (S10). When the amount of movement does not reach the distance DS, the routine is returned to step S7. When the amount of movement reaches the distance DS, the routine is moved to step S11.

What the routine is moved to step S11 means that the signal exceeding the threshold value LE cannot be detected while the objective lens 6 is moved in the distance DS. Thus, in step S11, the threshold value LE is set to be lower. For instance, the threshold value LE is set to be about two thirds of the previous one. The routine is moved to step S12. When the routine is moved to step S12, the objective lens 6 has been already close to the optical disc surface. So, in step S12, while the objective lens 6 is moved in the reverse direction, that is, in the direction moving away from the optical disc, the signal level obtained from the light receiving device 9 is monitored. In step S13, whether or not the signal level monitored exceeds the threshold value LE is determined and when the signal level exceeds the threshold value LE, the focus control is started (S14). When the signal level does not reach the threshold value LE, the routine is returned to step S5.

As described above, the focus control can be started while contact of the objective lens 6 and the optical disc is prevented. In step S6, to immediately start the focus control, the objective lens 6 is preferably moved at high speed. On the other hand, in step S7 and thereafter, the moving speed of the objective lens 6 is desirably lowered so as not to miss the state that the signal level is high.

It is desired that the optical heads 30 and 40 have a mechanism for moving the collimate lens 4 in the optical axis direction in order to change the amount of spherical aberration of the focusing optical system according to the protective material thickness of the optical disc. In this case, in step S2, while the protective material thickness of the optical disc is determined to be larger than 0.1 mm and the routine is moved to step S3, that is, between steps S2 and S3, it is desired that the collimate lens 4 be moved in such a manner that the amount of spherical aberration of the plus-first-order diffraction light is suitable to 0.6 mm. By this operation, the amplitude of the signal D1 can be maximum so as to start the focus control more stably.

(Embodiment 5)

Figure 15:
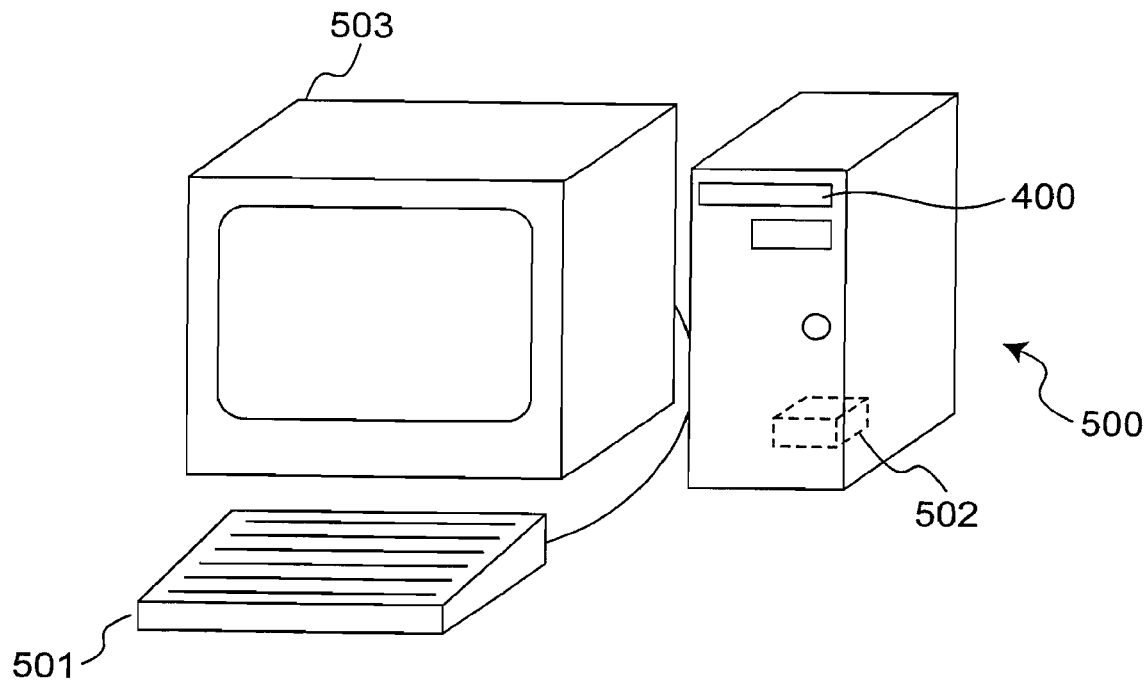
FIG. 15 is a schematic block diagram of a computer according to Embodiment 5 of the present invention.

FIG. 15 is a schematic diagram of the computer according to an embodiment of the present invention.

In FIG. 15, a computer 500 has the optical disc apparatus 400 according to Embodiment 4, an input device 501, such as a keyboard, mouse, or touch panel, for inputting information, a computation device 502 such as a central processing unit (CPU) for performing computation based on information inputted from the input device 501 and information read by the optical disc apparatus, and an output device 503, such as a CRT, liquid crystal display, or printer, for displaying information such as the result computed by the computation device 502.

The computer 500 has the optical disc apparatus 400 according to Embodiment 4, so the computer 500 can satisfactorily perform write or read of plural different kinds of optical discs and can be widely applicable.

(Embodiment 6)

Figure 16:
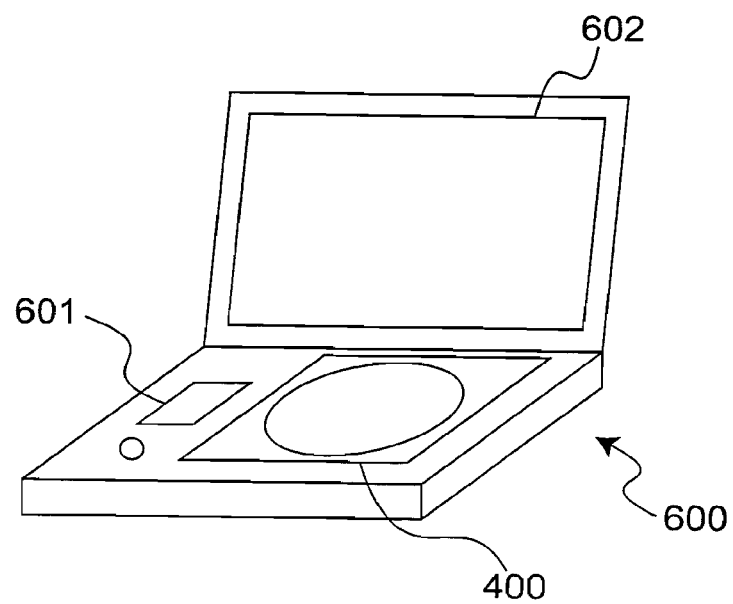
FIG. 16 is a schematic block diagram of an optical disc player according to Embodiment 6 of the present invention.

FIG. 16 is a schematic diagram of the optical disc player according to an embodiment of the present invention.

In FIG. 16, an optical disc player 600 has the optical disc apparatus 400 according to Embodiment 4, and a conversion device (e.g., a decoder 601) from information to an image, for converting an information signal obtained from the optical disc apparatus 400 to an image signal.

The optical disc player 600 can be used as a car navigation system by adding a position sensor such as a GPS and a central processing unit (CPU). The optical disc player 600 can add a display device 602 such as a liquid crystal monitor.

As the optical disc player 600 has the optical disc apparatus 400 according to Embodiment 4, the optical disc player 600 can satisfactorily perform write or read of plural different kinds of optical discs and can be widely applicable.

(Embodiment 7)

Figure 17:
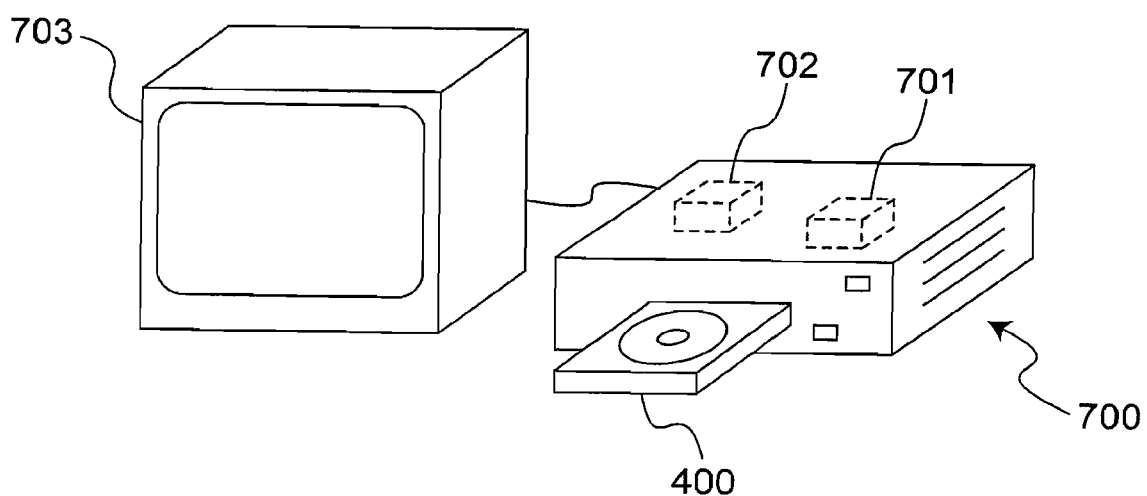
FIG. 17 is a schematic block diagram of an optical disc recorder according to Embodiment 7 of the present invention.

FIG. 17 is a schematic diagram of the optical disc recorder according to an embodiment of the present invention.

In FIG. 17, an optical disc recorder 700 has the optical disc apparatus 400 according to Embodiment 4, and a conversion device (e.g., an encoder 701) from an image to information, for converting image information to an information signal recorded onto the optical disc by the optical disc apparatus 400. Desirably, the optical disc recorder 700 also has a conversion device (e.g., a decoder 702) from information to an image, for converting an information signal obtained from the optical disc apparatus 400 to image information and can read a recorded image. The optical disc recorder 700 may have an output device 703, such as a CRT, a liquid crystal display, and a printer, for displaying information.

As the optical disc recorder 700 has the optical disc apparatus 400 according to Embodiment 4, the optical disc recorder 700 can satisfactorily perform write or read of plural different kinds of optical discs and can be widely applicable.

The optical head of the present invention can satisfactorily perform write or read of plural different kinds of optical discs. The optical disc apparatus of the present invention and the computer, optical disc player, and optical disc recorder having the optical disc apparatus can satisfactorily perform write or read of plural different kinds of optical discs. Thus, they can be widely applicable.

Arbitrary ones of the above various embodiments are combined with each other, as needed, so as to exhibit the respective effects.

The present invention is sufficiently described in conjunction with the preferred embodiments with reference to the accompanying drawings. It is apparent that various modifications and corrections can be made for those skilled in the art. Such modifications and corrections should be understood to be included in the scope of the present invention of the attached claims without departing from it.

All of the disclosed contents of the specifications, drawings, claims, and abstracts of Japanese Patent Application No. 2006-331534 filed on Dec. 8, 2006 and U.S. Provisional Patent Application No. 60/877,606 filed in the United States on Dec. 29, 2006 are incorporated into this specification by reference.

What is claimed is:

1. An objective lens comprising:

a diffraction structure configured to diffract a laser beam emitted from a light source so as to generate diffraction lights of a plurality of orders, focus a zero-order diffraction light generated by the diffraction structure onto an information recording surface of a first information recording medium, focus a plus-first-order diffraction light onto an information recording surface of a second information recording medium, and focus a minus-first-order diffraction light onto a position other than a surface of the first information recording medium, wherein an optical path of the laser beam before being reflected on the information recording medium is an advancing path, an optical path of the laser beam after being reflected on the information recording medium is a returning path, a position on an optical axis of a condensed point in which a diffraction light with the zero-order diffraction light in the advancing path and the zero-order diffraction light in the returning path, reflected on the information recording surface of the first information recording medium, is focused at the condensed point by a condensing lens for focusing the laser beam reflected on the information recording surface of the first information recording medium and is different from a position on the optical axis of the condensed point in which a diffraction light with the zero-order diffraction light in one path either the advancing path or the returning path and the minus-first-order diffraction light in the other path, reflected on the surface of the first information recording medium, is focused at the condensed point by the condensing lens, and wherein a protective material design thickness of the information recording surface of the first information recording medium is t1, a protective material design thickness of the information recording surface of the second information recording medium is t2, a refractivity of the protective material of the first and second information recording medium is n, a first protective material thickness of the information recording surface of the first information recording medium is t1_L1, a second protective material thickness of the information recording surface of the first information recording medium is t1_L2, a working distance for write or read of the first information recording medium is WD1, a working distance for write or read of the second information recording medium is WD2, and a focal position interval difference between a plus-first-order diffraction light and the minus-first-order diffraction light is k, then $$WD1-WD2 \neq (t2-t1-2 \times t1\_L1)/n-k$$

and $$WD1-WD2 \neq (t2-t1-2 \times t1\_L2)/n-k$$

are satisfied.

2. The objective lens according to claim 1, wherein the objective lens further satisfies $$WD1-WD2 < (t2-t1-2 \times t1\_L1)/n-k,$$

then t1_L1>t1_L2.

3. The objective lens according to claim 1, wherein the objective lens is configured to focus laser beams having different wavelengths emitted from the light source onto the information recording surface of the first information recording medium and the information recording surface of the second information recording medium, respectively.

4. The objective lens according to claim 1, wherein t1<t2 is satisfied.

5. The objective lens according to claim 1, wherein the diffraction structure is configured to be integrated with a diffraction device.

6. The objective lens according to claim 5, wherein the objective lens has an effective region having a first diffraction region in which a predetermined diffraction structure is disposed in an inner periphery region including the optical axis of the objective lens and a second diffraction region in which a diffraction structure different from that of the first diffraction region is formed around the first diffraction region.

7. An optical head comprising:
a light source;
an objective lens configured to focus a laser beam generated by the light source onto information recording surfaces of a first information recording medium and a second information recording medium;
a condensing lens configured to condense a respective laser beam reflected on the first information recording medium and the second information recording medium; and
a light receiving unit configured to receive the respective laser beam condensed by the condensing lens so as to generate a focus error signal,
wherein the objective lens has
a diffraction structure configured to diffract the laser beam emitted from a light source so as to generate diffraction lights of a plurality of orders, focus a zero-order diffraction light generated by the diffraction structure onto the information recording surface of the first information recording medium, focus a plus-first-order diffraction light onto the information recording surface of the second information recording medium, and focus a minus-first-order diffraction light onto a position other than the surface of the first information recording medium,
wherein an optical path of the laser beam before being reflected on the first or second information recording medium is an advancing path, an optical path of the laser beam after being reflected on the first or second information recording medium is a returning path,
a position on an optical axis of a condensed point in which the diffraction light with the zero-order diffraction light in the advancing path and the zero-order diffraction light in the returning path, reflected on the information recording surface of the first information recording medium, is focused at the condensed point by a condensing lens for focusing the laser beam reflected on the information recording surface of the first information recording medium is different from a position on the optical axis of the condensed point in which a diffraction light with the zero-order diffraction light in one path either the advancing path or the returning path and the minus-first-order diffraction light in the other path, reflected on the surface of the first information recording medium, is focused at the condensed point by the condensing lens, and
wherein a protective material design thickness of the information recording surface of the first information recording medium is t1, a protective material design thickness of the information recording surface of the second information recording medium is t2, a refractivity of the protective material of the first and second information recording medium is n, a first protective material thickness of the information recording surface of the first information recording medium is t1_L1, a second protective material thickness of the information recording surface of the first information recording medium is t1_L2, a working distance for write or read of the first information recording medium is WD1, a working distance for write or read of the second information recording medium is WD2, and a focal position interval difference between a plus-first-order diffraction light and the minus-first-order diffraction light is k,
then $$WD1-WD2 \neq (t2-t1-2\times t1\_L1)/n-k$$

and $$WD1-WD2 \neq (t2-t1-2\times t1\_L2)/n-k$$

are satisfied.

8. An optical disc apparatus comprising:
an optical head;
a motor configured to rotate and drive an information recording medium; and
a control unit configured to control the optical head and the motor;
wherein the optical head has
a light source,
an objective lens configured to focus a laser beam generated by the light source onto information recording surfaces of a first information recording medium and a second information recording medium,
a condensing lens configured to condense a respective laser beam reflected on the first information recording medium and the second information recording medium, and
a light receiving unit configured to receive the respective laser beam condensed by the condensing lens so as to generate a focus error signal,
wherein the objective lens has
a diffraction structure configured to diffract the laser beam emitted from the light source so as to generate diffraction lights of a plurality of orders, focus a zero-order diffraction light generated by the diffraction structure onto the information recording surface of a first information recording medium, focus a plus-first-order diffraction light onto the information recording surface of the second information recording medium, and focus a minus-first-order diffraction light onto a position other than the surface of the first information recording medium,
wherein an optical path of the laser beam before being reflected on the information recording medium is an advancing path, and an optical path of the laser beam after being reflected on the information recording medium is a returning path,
a position on an optical axis of a condensed point in which a diffraction light with the zero-order diffraction light in the advancing path and the zero-order diffraction light in the returning path, reflected on the information recording surface of the first information recording medium, is focused at the condensed point by a condensing lens for focusing the laser beam reflected on the information recording surface of the first information recording medium is different from a position on the optical axis of the condensed point in which a diffraction light with the zero-order diffraction light in one path either the advancing path or the returning path and the minus-first-order diffraction light in the other path, reflected on the surface of the first information recording medium, is focused at the condensed point by the condensing lens, and wherein a protective material design thickness of the information recording surface of the first information recording medium is t1, a protective material design thickness of the information recording surface of the second information recording medium is t2, a refractivity of the protective material of the first and second information recording medium is n, a first protective material thickness of the information recording surface of the first information recording medium is t1_L1, a second protective material thickness of the information recording surface of the first information recording medium is t1_L2, a working distance for write or read of the first information recording medium is WD1, a working distance for write or read of the second information recording medium is WD2, and a focal position interval difference between a plus-first-order diffraction light and the minus-first-order diffraction light is k, then $$WD1-WD2 \neq (t2-t1-2 \times t1\_L1)/n-k$$

and $$WD1-WD2 \neq (t2-t1-2 \times t1\_L2)/n-k$$

are satisfied.

* * * * *